United States Patent
Jones

(10) Patent No.: US 10,114,103 B2
(45) Date of Patent: Oct. 30, 2018

(54) SYSTEM AND METHOD FOR SENSOR TRIGGERING FOR SYNCHRONIZED OPERATION

(71) Applicant: Uber Technologies, Inc., San Francisco, CA (US)

(72) Inventor: Morgan Jones, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/464,787

(22) Filed: Mar. 21, 2017

(65) Prior Publication Data

US 2017/0269601 A1  Sep. 21, 2017

Related U.S. Application Data

(60) Provisional application No. 62/311,267, filed on Mar. 31, 2016.

(51) Int. Cl.
| | |
|---|---|
| G05D 1/02 | (2006.01) |
| G05D 1/00 | (2006.01) |
| G01S 5/00 | (2006.01) |
| G01S 19/13 | (2010.01) |

(52) U.S. Cl.
CPC ............ *G01S 5/00* (2013.01); *G01S 19/13* (2013.01)

(58) Field of Classification Search
CPC ...... G05D 1/0214; G05D 1/0088; G01S 5/00; G01S 19/13
USPC ......... 701/27; 280/735; 340/12.15; 307/10.1
See application file for complete search history.

(56) References Cited

U.S. PATENT DOCUMENTS

| | | |
|---|---|---|
| 3,899,928 A | 8/1975 | Fraiture |
| 3,932,858 A | 1/1976 | Smith |
| 3,941,203 A | 3/1976 | Leconte |
| 4,217,644 A | 8/1980 | Kato |
| 4,255,789 A | 3/1981 | Hartford |
| 4,325,336 A | 4/1982 | Kuno et al. |
| 4,408,290 A | 10/1983 | Kubo |
| 4,536,748 A | 8/1985 | Tonello |
| 4,810,953 A | 3/1989 | Huynh |
| 5,357,141 A * | 10/1994 | Nitschke ............ B60R 16/0315 280/735 |
| 5,369,591 A | 11/1994 | Broxmeyer |
| 5,450,329 A | 9/1995 | Tanner |
| 5,469,371 A | 11/1995 | Bass |
| 5,682,100 A | 10/1997 | Rossi |
| 5,740,047 A | 4/1998 | Pilley |
| 5,812,427 A | 9/1998 | Nonoyama |
| 5,831,570 A | 11/1998 | Ammar |
| 5,907,293 A | 5/1999 | Tognazzini |
| 5,983,161 A | 11/1999 | Lemelson |
| 6,115,659 A | 9/2000 | Buchheim |
| 6,154,292 A | 11/2000 | Motoi |

(Continued)

*Primary Examiner* — Marthe Y Marc-Coleman
(74) *Attorney, Agent, or Firm* — Mahamedi IP Law LLP

(57) ABSTRACT

A sensor triggering system for a sensor apparatus including a plurality of sensors. The system detects a first sensor pulse and determines a memory address of a lookup table based on the first sensor pulse. In response to the first sensor pulse, the system selectively triggers one or more of the plurality of sensors based at least in part on a codeword stored at the first memory address. For example, the codeword may comprise a number of bits such that each bit of the codeword indicates an activation state for a respective one of the plurality of sensors.

20 Claims, 14 Drawing Sheets

(56) References Cited

U.S. PATENT DOCUMENTS

| | | |
|---|---|---|
| 6,360,171 B1 | 3/2002 | Miyamoto |
| 6,370,475 B1 | 4/2002 | Breed |
| 6,405,132 B1 | 6/2002 | Breed |
| 6,606,033 B1 | 8/2003 | Crocker |
| 6,611,755 B1 | 8/2003 | Coffee |
| 6,873,642 B1 | 3/2005 | Fey |
| 7,200,409 B1 | 4/2007 | Ichikawa |
| 7,295,925 B2 | 11/2007 | Breed |
| 7,333,725 B1 | 2/2008 | Frazier |
| 7,426,437 B2 | 9/2008 | Breed |
| 7,840,355 B2 | 11/2010 | Breed |
| 8,355,117 B2 | 1/2013 | Niclass |
| 8,849,494 B1 | 9/2014 | Herbach |
| 9,103,671 B1 | 8/2015 | Breed |
| 2002/0071509 A1 | 6/2002 | Richards |
| 2002/0181799 A1 | 12/2002 | Matsugu |
| 2003/0009275 A1 | 1/2003 | Koike |
| 2003/0061002 A1 | 3/2003 | Steinbrecher |
| 2003/0112133 A1 | 6/2003 | Webb |
| 2003/0218551 A1 | 11/2003 | Crocker |
| 2004/0101161 A1 | 5/2004 | Roh |
| 2004/0119633 A1 | 6/2004 | Oswald |
| 2004/0128062 A1 | 7/2004 | Ogino |
| 2004/0133390 A1 | 7/2004 | Osorio |
| 2004/0138809 A1 | 7/2004 | Mukaiyama |
| 2004/0249485 A1 | 12/2004 | Bondarev |
| 2005/0088318 A1 | 4/2005 | Liu |
| 2007/0030342 A1 | 2/2007 | Wilburn |
| 2007/0076652 A1 | 4/2007 | Nishiwaki |
| 2007/0244643 A1 | 10/2007 | Tengler |
| 2007/0276600 A1 | 11/2007 | King |
| 2007/0286471 A1 | 12/2007 | Kaneda |
| 2008/0040023 A1 | 2/2008 | Breed |
| 2008/0247735 A1 | 10/2008 | Kazanzides |
| 2009/0051396 A1 | 2/2009 | Shimamoto |
| 2010/0054282 A1 | 3/2010 | Schirmer |
| 2011/0002378 A1 | 1/2011 | Raveendran |
| 2011/0002379 A1 | 1/2011 | Raveendran |
| 2011/0002405 A1 | 1/2011 | Raveendran |
| 2011/0125063 A1 | 5/2011 | Shalon |
| 2012/0096942 A1 | 4/2012 | Hayashi |
| 2014/0177932 A1 | 6/2014 | Milne |
| 2015/0204983 A1 | 7/2015 | Georgy |
| 2016/0103002 A1 | 4/2016 | Milota |

* cited by examiner

SYSTEM AND METHOD FOR SENSOR TRIGGERING FOR SYNCHRONIZED OPERATION

RELATED APPLICATIONS

This application claims benefit of priority to Provisional U.S. Patent Application No. 62/311,267, filed Mar. 21, 2016; the aforementioned priority application being hereby incorporated by reference in its entirety.

TECHNICAL FIELD

Examples described herein relate to autonomous vehicles, and more specifically, to acquiring time-synchronized sensor data for controlling autonomous vehicles.

BACKGROUND

Autonomous vehicles have replaced human drivers with computer-implemented intelligence to control and/or drive the vehicle. Autonomous vehicles typically utilize a number of sensors and other automation technology to help navigate the surrounding environment. For example, three-dimensional (3D) sensing technology may be used to map a vehicle's local environment and larger surrounding areas. This enables an autonomous vehicle to safely navigate and traverse terrain while avoiding both static objects (e.g., trees, structures, drop-offs, etc.) and dynamic objects (e.g., people, animals, vehicles, etc.) in its path.

3D sensing technology relies on real-time sensor data from a number of sensors to construct a 3D image of the surrounding environment. However, the timing of the sensor data is important to accurately construct the 3D image, especially when the autonomous vehicle is traveling at high speeds.

DETAILED DESCRIPTION

Figure 1:
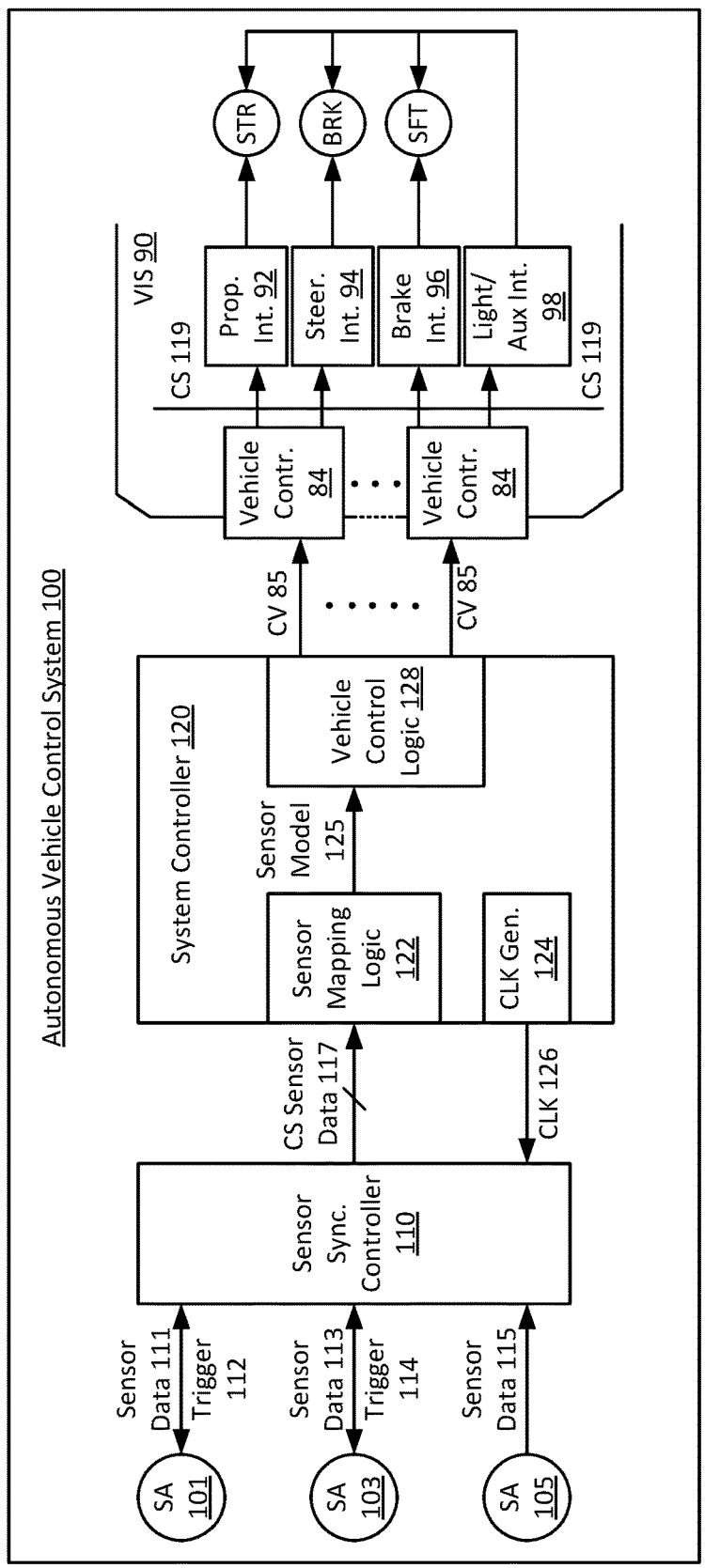
FIG. 1 shows a block diagram of a control system for operating an autonomous vehicle in accordance with example implementations.

Examples described herein provide for a sensor triggering system that may be used to trigger activation of a plurality of sensors. The captured sensor data is time-synchronized in relation to the local clock signal and may thus be used for controlling and/or navigating an autonomous vehicle. Examples of autonomous vehicles for which the sensor triggering system may be implemented can be found in commonly owned U.S. patent application Ser. No. 14/967,154, filed Dec. 11, 2015 and titled "System For Acquiring Time-Synchronized Sensor Data," the entirety of which is hereby incorporated by reference.

According to some examples, the sensor triggering system detects a first sensor pulse and determines a first memory address of a lookup table based on the first sensor pulse. In response to the first sensor pulse, the system may selectively trigger one or more of the plurality of sensor based at least in part on a codeword stored at the first memory address. The codeword may comprise a number of bits at least equal to a number of sensors in the sensor apparatus. For example, each bit of the codeword may indicate an activation state for a respective one of the plurality of sensors. For each sensor the plurality of sensors, the system may trigger the sensor if a corresponding bit of the codeword is asserted.

The sensor triggering system may further detect a second sensor pulse that is offset in phase relative to the first sensor pulse by a predetermined amount. The system may determine a second memory address of the lookup table based on the second sensor pulse. For example, the second memory address may be determined by incrementing the first memory address. In response to the second sensor pulse, the system may selectively trigger one or more of the plurality of sensors based at least in part on a codeword stored at the second memory address.

Still further, in some examples, the sensor triggering system may generate the first sensor pulse based at least in part on a local clock signal. For example, the system may count a number of clock pulses of the local and generate the first sensor pulse when the number of clock pulses reaches a count threshold. In some implementations, the system may receive a pulse per second (PPS) signal via a global positioning system (GPS) receiver. The system may further determine the count threshold based on a number of clock pulses of the local clock signal occurring between consecutive pulses of the PPS signal.

One or more implementations described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more implementations described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components.

Alternatively, a module or component can be a shared element or process of other modules, programs or machines.

Numerous examples are referenced herein in context of an autonomous vehicle. An autonomous vehicle refers to any vehicle which is operated in a state of automation with respect to steering and propulsion. Different levels of autonomy may exist with respect to autonomous vehicles. For example, some vehicles today enable automation in limited scenarios, such as on highways, provided that drivers are present in the vehicle. More advanced autonomous vehicles drive without any human driver inside the vehicle. Such vehicles often are required to make advance determinations regarding how the vehicle is behave given challenging surroundings of the vehicle environment.

As described herein, "time-synchronized sensor data" refers to sensor data that may be captured or acquired by respective sensors at the direction of a system controller (e.g., in response to triggers or activation commands) in synchronization with a local clock signal. For example, the capture of time-synchronized sensor data may be timed in accordance with a predetermined schedule known to the system controller. In contrast, "asynchronous sensor data" refers to sensor data that is not captured or acquired according to any known schedule. For example, the asynchronous sensor data may be captured by respective sensors that operate independently (e.g., not under the direct control of the system controller), and may thus be received at unpredictable times.

System Description

FIG. 1 shows a block diagram of a control system 100 for operating an autonomous vehicle in accordance with example implementations. The control system 100 includes a sensor synchronization controller 110, a system controller 120, and a vehicle interface subsystem (VIS) 90. As illustrated in FIG. 1, the control system 100 is used to autonomously operate a vehicle (not shown for simplicity) in a given geographic region for a variety of purposes, including transport services (e.g., transport of humans, delivery services, etc.). In examples described, an autonomously operated vehicle can drive and/or navigate without human intervention. For example, in the context of automobiles, an autonomously driven vehicle can steer, accelerate, shift, brake and operate lighting components. Some variations also recognize that an autonomous-capable vehicle can be operated autonomously, manually, or a combination of both.

As illustrated in FIG. 1, the control system 100 utilizes a number of sensor resources to intelligently guide or navigate the vehicle through a given environment. For example, the control system may include a number of sensor apparatuses (SA) 101, 103, and 105 that generate respective sensor data 111, 113, and 115. Each sensor apparatus may include one or more sensors that may capture a particular type of information about the surrounding environment. As illustrated in FIG. 1, the first sensor apparatus 101 may include a number of camera modules that can capture still images and/or videos (e.g., as sensor data 111); the second sensor apparatus 103 may include a laser rangefinder that can determine distance information to nearby objects (e.g., as sensor data 113) using laser ranging techniques; and the third sensor apparatus 105 may include an inertial measurement unit (IMU) that can detect velocity, orientation, and/or gravitational information (e.g., as sensor data 115) pertaining to the autonomous vehicle.

The control system 100 of FIG. 1 is not limited to the sensors described in the examples herein. In some implementations, the control system 100 may include fewer or more sensor apparatuses and/or types of sensors than described herein with respect to FIG. 1. For example, the control system 100 may further include proximity sensors, touch sensors, photosensors, sonar, radar, rotary encoders, and/or any other sensors technology that may be used to detect and/or gather information about the surrounding environment.

In example implementations, the sensor data 111, 113 and 115, may be combined to provide a computerized perception of the space and environment surrounding the vehicle. For example, the first sensor apparatus 101 may correspond, at least in part, to a machine vision camera that can be used to generate a three-dimensional (3D) representation of the surrounding environment. For example, still images (e.g., included with sensor data 111) from multiple camera modules of the first sensor apparatus 101 may be "stitched" together to generate a 3D (e.g., stereoscopic) sensor image. The 3D sensor image may indicate the size and distance of objects in the vicinity of the autonomous vehicle (e.g., within viewable range of the sensor apparatus 101). In order to generate an accurate 3D sensor image of the environment at any given time, the machine vision camera relies on sensor data that was captured or acquired at that particular instance of time. Attempting to synthesize multiple images captured at different instances of time may result in optical distortions in the 3D sensor image.

Conventional machine vision cameras operate in an asynchronous manner. For example, individual camera modules may capture images at various times and/or framerates independent of other camera modules within the machine vision camera. Thus, a processor of the machine vision camera would typically have to determine and resolve any discrepancies in the timing of sensor data received from each of the camera modules before it can use the sensor data to construct a 3D sensor image. This process becomes even less efficient as the demand for sensor data increases (e.g., due to increased framerates and/or number of camera modules). Therefore, conventional machine vision cameras may not be efficient or accurate enough for creating real-time 3D sensor images that can be used to safely navigate an autonomous vehicle, especially at high speeds (e.g., 60+ mph).

The example implementations recognize that, in order to satisfy the machine vision demands of autonomous vehicles, it may be desirable to capture sensor data from multiple sensors in a time-synchronized manner. Thus, in example implementations, activation of at least some of the sensor apparatuses 101, 103, and 105 (e.g., to capture or acquire sensor data) may be directly controlled by the control system 100 and/or sensor synchronization controller 110. As illustrated in FIG. 1, sensor apparatuses 101 and 103 may capture sensor data 111 and 113 in response to triggers 112 and 114, respectively, from the sensor synchronization controller 110. As described in greater detail below with respect to FIGS. 4A-4C, the triggers 112 and 114 may cause individual sensors of the sensor apparatuses 101 and 103 to capture respective sensor data in a time-synchronized manner.

In some implementations, the sensor synchronization controller 110 may send the triggers 112 and 114 to the respective sensor apparatuses 101 and 103 in accordance with a sensor activation schedule. For example, the sensor activation schedule may be a predetermined schedule for activating the sensor apparatuses 101 and 103. More specifically, the sensor activation schedule may indicate what sensors are to be activated at what times. The sensor activation schedule may be user configured or programmatically generated by the control system 100, for example, based on one or more operating parameters of the autonomous vehicle (e.g., vehicle speed, vehicle function, desired framerate or resolution, etc.). In some aspects, the sensor activation schedule may be synchronized with a local clock signal (CLK) 126 of the control system 100. For example, the local clock signal 126 may be a shared clock signal that is used by other components and/or elements of the control system 100 for timing purposes. Synchronizing the sensor activation schedule with the local clock signal 126 allows the timing of the sensor data 111 and/or 113 to be quickly determined with respect to a common reference timing signal.

In some aspects, one or more sensors of the first sensor apparatus 101 may capture sensor data at substantially the same time as other sensors of the first sensor apparatus 101. In other aspects, at least some of the sensor data 111 captured by the first sensor apparatus 101 may coincide, temporally, with at least some of the sensor data 113 captured by the second sensor apparatus 103. The time-synchronized sensor data 111 and/or 113 may be quickly and accurately combined to generate 3D sensor images that can be used for navigating the autonomous vehicle. Moreover, by controlling the precise times at which the sensor data 111 and/or 113 is captured (e.g., according to a sensor activation schedule), the control system 100 may reliably update the 3D sensor image even when the vehicle is travelling at high speeds.

The example implementations further recognize that the control system 100 may include one or more asynchronous sensors (e.g., sensor apparatus 105). For example, the third sensor apparatus 105 may not respond to triggers from the sensor synchronization controller 110. Rather, the asynchronous sensor apparatus 105 may capture sensor data 115 at preconfigured rates and/or times (e.g., in reaction to changes in the environment, based on its own internal clock, in response to manual input, etc.). In example implementations, the sensor synchronization controller 110 may determine a relative timing of the asynchronous sensor data 115 with respect to the local clock signal 126. This may enable the sensor data 115 to be used by other processors and/or components of the control system 100. For example, the sensor data 115 may be combined with similarly-timed sensor data 111 and/or 113 to generate a 3D sensor image at the given instance of time.

The sensor synchronization controller 110 may correspond to a dedicated processing resource, such as a field programmable gate array ("FPGA"), that receives and/or processes raw sensor data 111, 113 and 115, received from the sensor apparatuses 101-105. More specifically, the sensor synchronization controller 110 may convert the raw sensor data 111, 113 and 115, to clock-synchronized (CS) sensor data 117. In example implementations, the CS sensor data 117 may be formatted for a particular communications platform implemented by the control system 100. In some aspects, the sensor synchronization controller 110 may convert the raw sensor data 111, 113 and 115, into a platform-specific format (e.g., as CS sensor data 117) by adding a timestamp to the sensor data indicating the time at which the corresponding sensor data is captured or acquired in relation to the local clock signal 126. For example, the timestamp may be based on a sensor activation schedule used to trigger activation of individual sensors in the sensor apparatuses 101 and/or 103. In some examples, the timestamp may be based on a phase or timing of the local clock signal 126 when the sensor data 115 is acquired. In such examples, the system controller 120 may also include clock generation circuitry 124 to generate the local clock signal 126. In some examples, local clock signal 126 can be used by other elements of the control system 100 (e.g., for timing purposes). Still further, in some aspects, the sensor synchronization controller 110 may add additional parameters or fields (e.g., header, footer, status bit, etc.) to the raw sensor data 111, 113 and 115, when converting the sensor data to CS sensor data 117.

The system controller 120 may utilize the CS sensor data 117 to intelligently guide or navigate the vehicle through a given environment. For example, the system controller 120 may control operations of the vehicle such as steering, accelerating, and braking as the vehicle progresses to a destination. In some aspects, the system controller 120 may trigger vehicle control actions (e.g., braking, steering, accelerating) and/or perform route planning based at least in part on the CS sensor data 117. In other aspects, the system controller 120 may use the CS sensor data 117 to provide additional inputs for the vehicle (e.g., transmissions from remote or local human operators, network communication from other vehicles, etc.). Still further, in some aspects, the system controller 120 may communicate the CS sensor data 117 to one or more remote devices.

In example implementations, the system controller 120 includes sensor mapping logic 122 and vehicle control logic 128. The sensor mapping logic 122 creates a sensor model 125 based on the CS sensor data 117. More specifically, the sensor mapping logic 122 may combine CS sensor data 117 from multiple sensor apparatuses 101, 103, and/or 105 to create a more detailed description of the surrounding environment (e.g., provided as the sensor model 125) that can be used to more effectively navigate the vehicle through the environment. For example, the sensor model 125 may include information pertaining to detected objects in the vicinity of the vehicle and/or contextual information about the object, surroundings, and/or geographic region, for purposes of making predictive determinations to avoid collisions.

In some aspects, the sensor model 125 may include a 3D sensor image of the surrounding environment. For example, the 3D sensor image may include image data, captured by multiple camera modules (e.g., of sensor apparatus 101), stitched together to create stereoscopic images of the surrounding environment. The stereoscopic images may be used to detect the presence and/or distances of objects in the vicinity of the vehicle. In some examples, the image data may be combined with laser rangefinder data to produce a more complete picture of the surrounding environment. In some aspects, the laser rangefinder data may complement the image data for purposes of detecting objects that may not be detectable from the image data alone. In other aspects, the laser rangefinder data may be used to check or validate the image data, and vice-versa.

The vehicle control logic 128 generates vehicle commands (CV) 85 based at least in part on the sensor model 125. More specifically, the vehicle control logic 128 may control the vehicle by issuing instructions and data (e.g., vehicle commands 85) that programmatically control various electromechanical interfaces of the vehicle. The vehicle commands 85 can serve to control operational aspects of the vehicle, including propulsion, braking, steering, and auxiliary behavior (e.g., turning lights on). In example implementations, the vehicle control logic 128 utilizes the sensor model 125 to navigate the vehicle through a given environment (e.g., by issuing respective vehicle commands 85). For example, the vehicle commands 85 may specify actions that correlate to one or multiple vehicle control mechanisms (e.g., steering mechanism, brakes, etc.). More specifically, the vehicle commands 85 may specify the actions, along with attributes such as magnitude, duration, directionality or other operational characteristic of the vehicle 10.

The VIS (vehicle interface subsystem) 90 processes the vehicle commands 85 to control one or more operations of the vehicle. The vehicle interface subsystem 90 may include one or more vehicle controllers 84 that process and/or carry out the vehicle commands 85 issued by the vehicle control logic 128. More specifically, the vehicle controllers 84 may process the vehicle commands 85 as inputs to control propulsion, steering, braking, and/or other mechanical (or electrical) behavior of the vehicle. For example, while the vehicle follows a particular route, the controllers 84 may continuously adjust and/or alter the movement of the vehicle in response to vehicle commands 85 provided (e.g., in real-time) by the vehicle control logic 128.

In example implementations, the controllers 84 translate the vehicle commands 85 into control signals (CS) 119 for respective interfaces of the vehicle interface subsystem 90. For example, the vehicle interface subsystem 90 may include: a propulsion interface 92 to electrically (or through programming) control a propulsion component (e.g., a gas pedal), a steering interface 94 for a steering mechanism, a braking interface 96 for a braking component, and lighting/auxiliary interface 98 for exterior lights of the vehicle. The control signals 119 may be electrical signals that correlate to the specified vehicle action by virtue of electrical characteristics that have attributes for magnitude, duration, frequency or pulse, or other electrical characteristics.

Figure 2:
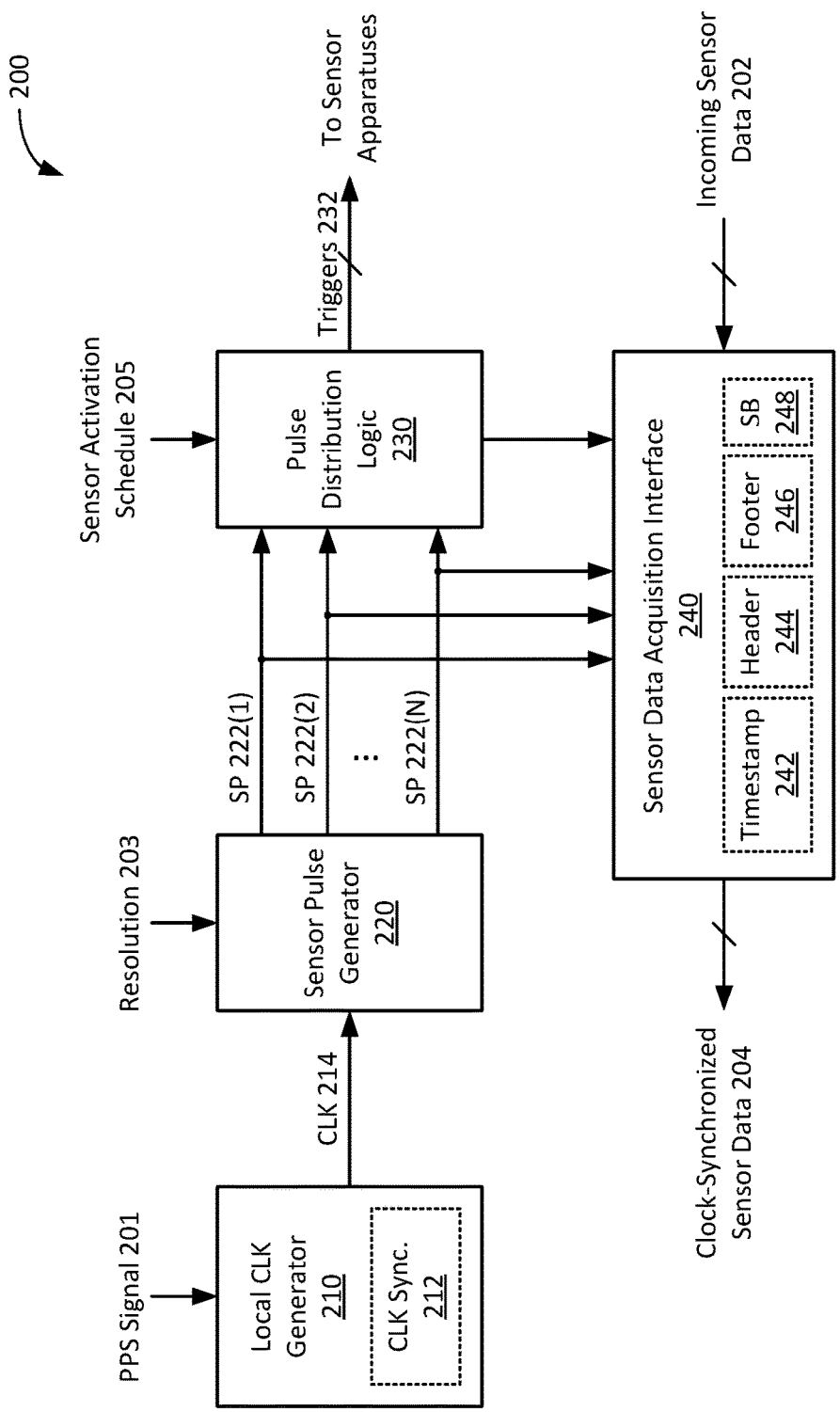
FIG. 2 shows a block diagram of a sensor synchronization system that may be used to synchronize sensor data across multiple sensors and sensor apparatuses.

FIG. 2 shows a block diagram of a sensor synchronization system 200 that may be used to synchronize sensor data across multiple sensors and sensor apparatuses. The sensor synchronization system 200 includes a local clock signal (CLK) generator 210, a sensor pulse generator 220, pulse distribution logic 230, and a sensor data acquisition interface 240. In example implementations, the sensor synchronization system 200 may be used to capture time-synchronized sensor data (e.g., by triggering activation of sensor apparatuses 101 and 103 of the control system 100) and/or determine timing information for asynchronous sensor data (e.g., received from sensor apparatus 105 of the control system 100).

The local CLK generator 210 generates a local clock signal 214 that may be used for timing purposes by other elements and/or components of an autonomous vehicle. More specifically, the local clock signal 214 may serve as a reference timing signal for synchronizing various components of the autonomous vehicle. In some implementations, the local CLK generator 210 may generate the local clock signal 214 based on an external timing signal. For example, the external timing signal may be a pulse per second (PPS) signal 201 received from a global positioning satellite (GPS) receiver (not shown). The PPS signal 201 may be a highly accurate and reliable external timing signal (e.g., derived from satellite signals) with which to align the local clock signal 214.

In some aspects, the local CLK generator 210 may include CLK synchronization circuitry 212 to periodically adjust or align a phase of the local clock signal 214 with a phase of the PPS signal 201. For example, the CLK synchronization circuitry 212 may perform the phase alignment each time a new pulse is received on the PPS signal 201 (e.g., every second). In some implementations, the CLK synchronization circuitry 212 may include a phase-locked loop (PLL) that generates the local clock signal 214 based at least in part on the PPS signal 201. More specifically, the PLL circuit may lock the phase of the local clock signal 214 to the phase of the PPS signal 201.

The sensor pulse generator 220 generates a number of sensor pulses (SP) 222(1)-222(N) based on the local clock signal 214. In example implementations, each of the sensor pulses 222(1)-222(N) may be offset in phase, relative to the local clock signal 214, by a respective amount. Because the sensor pulses 222(1)-222(N) are generated based on the local clock signal CLK, the sensor pulse generator 220 may update the sensor pulses 222(1)-222(N) in response to changes to the local clock signal CLK. Furthermore, the number (N) of sensor pulses 222(1)-222(N) generated, per clock cycle of the local clock signal 214, may depend on a desired granularity of timing. For example, a higher granularity (e.g., corresponding to more sensor pulses) may yield more precise timing information.

In some implementations, the granularity of timing may correspond, at least in part, with a resolution 203 of one or more sensor apparatuses. The resolution 203 may correspond to a desired rate (e.g., framerate) or amount of sensor activity to be captured within a given clock cycle of the local clock signal 124. In some aspects, the resolution 203 may be a user-configured input. In other aspects, the resolution 203 may be programmatically determined, at least in part, based on one or more operating parameters of the autonomous vehicle (e.g., vehicle speed, vehicle function, GPS coordinates, etc.).

Figure 3:
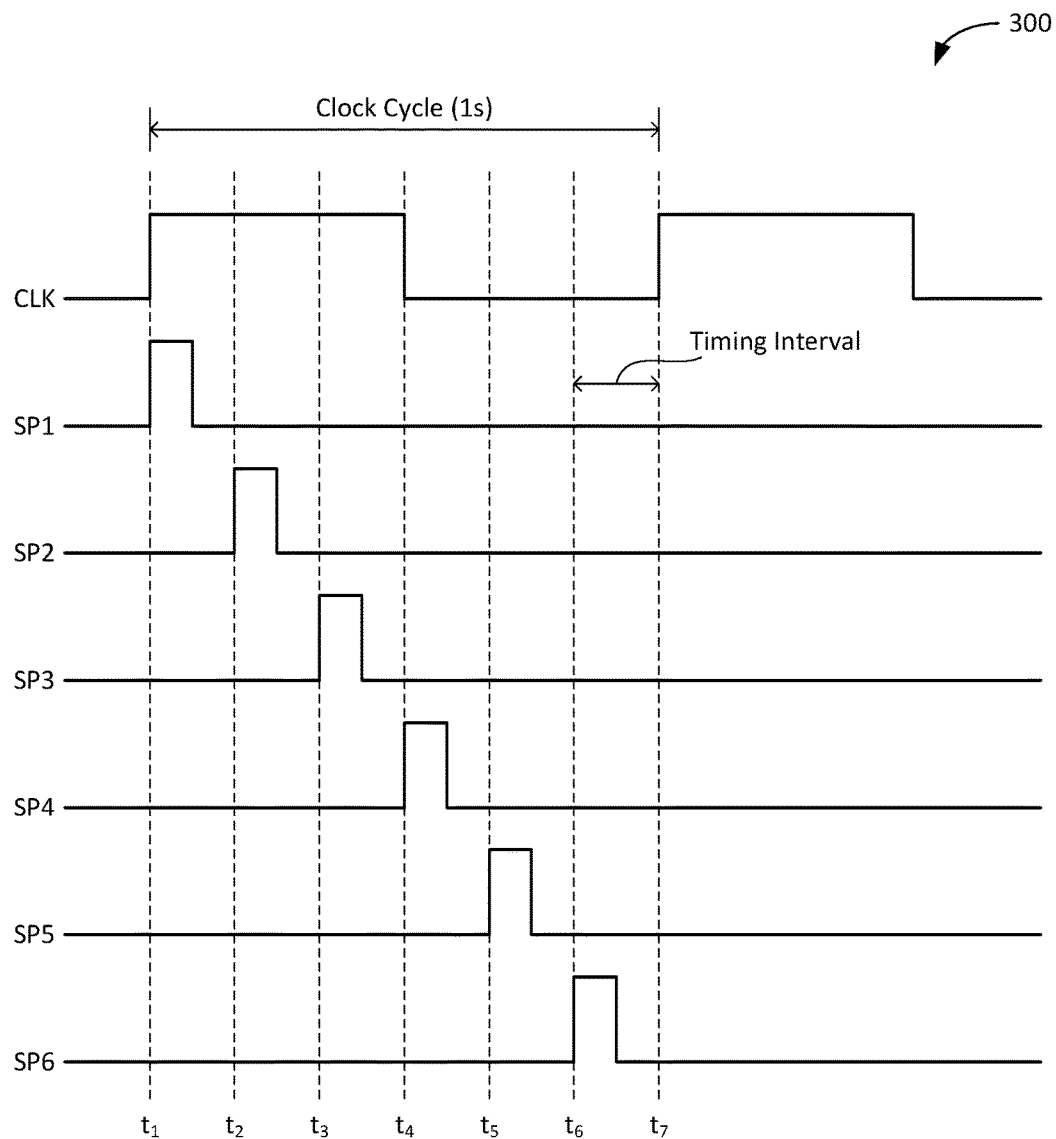
FIG. 3 shows a timing diagram depicting an example method for generating a number of sensor pulses based on a local clock signal.

FIG. 3 shows a timing diagram 300 depicting an example method for generating a number of sensor pulses based on a local clock signal. In the example of FIG. 3, the desired resolution 203 may be six frames per second. As described above, the local clock signal CLK may be synchronized with a PPS signal 201, and therefore has a clock cycle of one second (e.g., from times $t_1$ to $t_7$). Thus, the sensor pulse generator 220 may generate six sensor pulses SP1-SP6 for every clock cycle of the local clock signal. For example, the sensor pulse generator 220 may divide the clock cycle of the local clock signal CLK into six timing intervals of equal duration.

The sensor pulse generator 220 may generate the sensor pulses SP1-SP6 such that each sensor pulse coincides with a corresponding timing interval. Accordingly, the first sensor pulse is asserted and/or aligned with the start of the first timing interval (e.g., at time $t_1$); the second sensor pulse is asserted and/or aligned with the start of the second timing interval (e.g., at time $t_2$); the third sensor pulse is asserted and/or aligned with the start of the third timing interval (e.g., at time $t_3$); the fourth sensor pulse is asserted and/or aligned with the start of the fourth timing interval (e.g., at time $t_4$); the fifth sensor pulse is asserted and/or aligned with the start of the fifth timing interval (e.g., at time $t_5$); and the sixth sensor pulse is asserted and/or aligned with the start of the sixth timing interval (e.g., at time $t_6$). Each successive sensor pulse is offset in phase from the preceding sensor pulse by exactly one timing interval. In other words, with respect to the local clock signal CLK, SP1 is in-phase, SP2 is phase offset by 1 timing interval (~166 ms), SP3 is phase offset by 2 timing intervals (~333 ms), SP4 is phase offset by 3 timing intervals (~500 ms), SP5 is phase offset by 4 timing intervals (~666 ms), and SP6 is phase offset by 5 timing intervals (~833 ms). Thus, the timing of each of the sensor pulses may be determined from the timing of the local clock signal CLK.

The pulse distribution logic 230 controls the activation of one or more sensors (e.g., to capture sensor data at a given instance in time) based at least in part on the sensor pulses 222(1)-222(N). In example implementations, the pulse distribution logic 230 may package or distribute one or more of the sensor pulses 222(1)-222(N) as triggers 232 for activating each of a plurality of sensors. In some aspects, the pulse distribution logic 230 may send a respective trigger 232

(e.g., that includes one or more of the sensor pulses 222(1)-222(N)) to each sensor in accordance with a sensor activation schedule 205. As described above, the sensor activation schedule 205 may be a predetermined schedule for activating one or more sensors of a sensor apparatus (e.g., indicating which sensors are to be activated at what times). Moreover, the sensor activation schedule 205 may be user configured or programmatically generated based, at least in part, on one or more operating parameters of the autonomous vehicle (e.g., vehicle speed, desired sensor framerate or resolution, etc.).

Table 1 shows an example sensor activation schedule that may be used to trigger and/or control activation of six individual camera modules (C1-C6) of a machine vision camera. With reference to Table 1, a "1" indicates that the camera is to be activated at the given instance of time, whereas a "0" indicates that the camera is not to be activated at the given time. The sensor activation schedule below shows the sensor activation times for a single clock cycle of a local clock signal. In some aspects, the sensor activation schedule of Table 1 may be repeated or reused for subsequent clock cycles of the local clock signal. In other aspects, the sensor activation schedule of Table 1 may be modified or substituted for other sensor activation schedules in subsequent clock cycles.

TABLE 1

| Time | C1 | C2 | C3 | C4 | C5 | C6 | SP |
|---|---|---|---|---|---|---|---|
| $t_1$ | 1 | 1 | 1 | 1 | 1 | 1 | SP1 |
| $t_2$ | 1 | 1 | 1 | 1 | 1 | 1 | SP2 |
| $t_3$ | 1 | 1 | 1 | 1 | 1 | 1 | SP3 |
| $t_4$ | 1 | 1 | 1 | 1 | 1 | 1 | SP4 |
| $t_5$ | 1 | 1 | 1 | 1 | 1 | 1 | SP5 |
| $t_6$ | 1 | 1 | 1 | 1 | 1 | 1 | SP6 |

In the example sensor activation schedule of Table 1, each of the camera modules C1-C6 is scheduled to capture sensor (e.g., image) data at each interval of a clock cycle, from times $t_1$-$t_6$. In other words, the framerate of each of the camera modules C1-C6 is 6 frames per second. Thus, in order to capture time-synchronized sensor data from each of the camera modules C1-C6 at the desired framerate, the pulse distribution logic 230 may provide or distribute the six sensor pulses SP1-SP6 to each of the camera modules C1-C6. For example, each camera module may receive a respective trigger 232 that includes the sensor pulses SP1, SP2, SP3, SP4, SP5, and SP6, causing each camera module to capture image data at times $t_1$, $t_2$, $t_3$, $t_4$, $t_5$, and $t_6$, respectively.

Figure 4A:
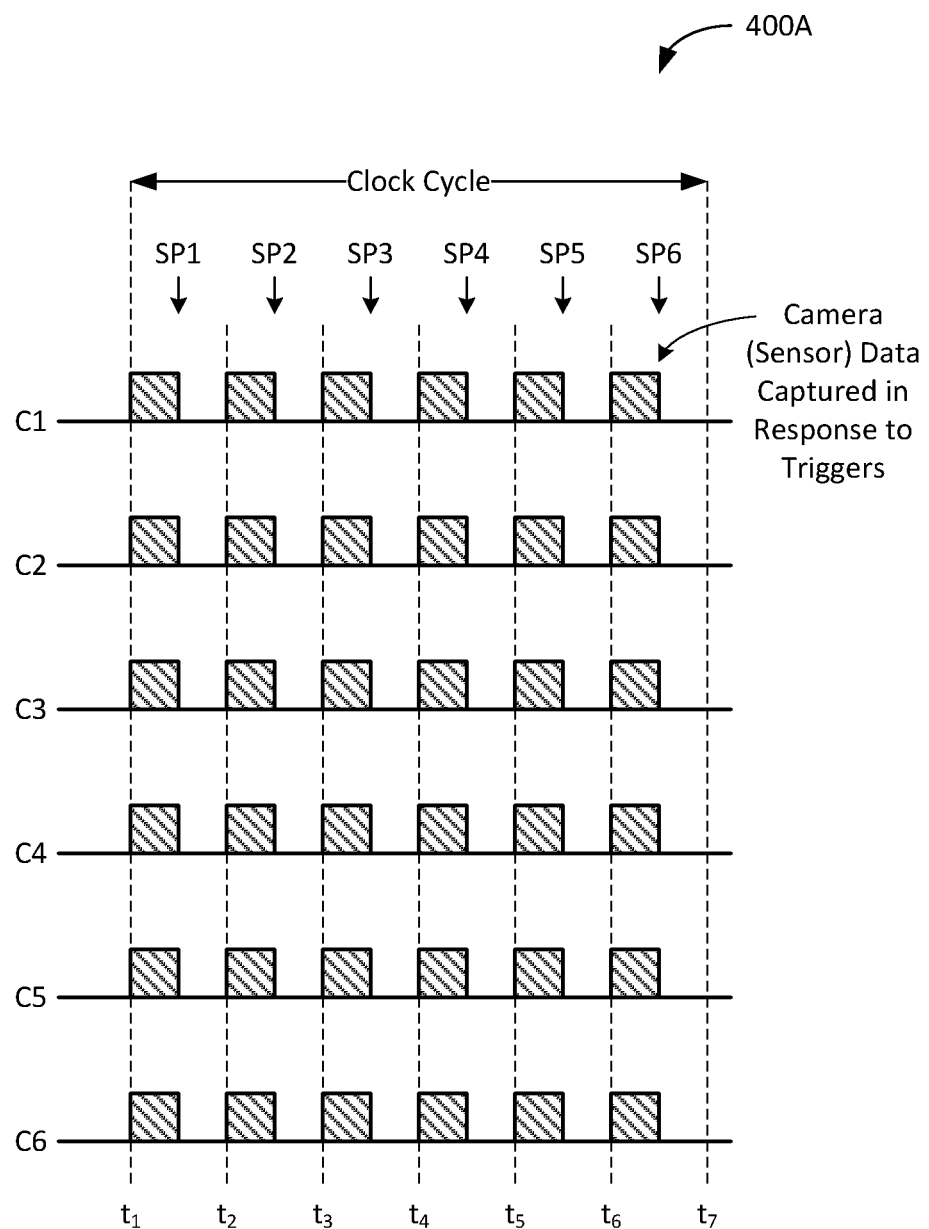
FIGS. 4A-4C show timing diagrams depicting example methods for triggering time-synchronized capture of sensor data.

FIG. 4A shows a timing diagram 400A depicting an example implementation of the sensor activation schedule of Table 1 for a single clock cycle of a local clock signal (e.g., from times $t_1$-$t_7$). For example, at time $t_1$, each of the camera modules C1-C6 captures respective sensor data in response to the first sensor pulse SP1; at time $t_2$, each of the camera modules C1-C6 captures respective sensor data in response to the second sensor pulse SP2; at time $t_3$, each of the camera modules C1-C6 captures respective sensor data in response to the third sensor pulse SP3; at time $t_4$, each of the camera modules C1-C6 captures respective sensor data in response to the fourth sensor pulse SP4; at time $t_5$, each of the camera modules C1-C6 captures respective sensor data in response to the fifth sensor pulse SP5; and at time $t_6$, each of the camera modules C1-C6 captures respective sensor data in response to the sixth sensor pulse SP6.

As shown in the example of FIG. 4A, at any given time $t_1$-$t_6$, the sensor data captured by each of the camera modules C1-C6 is time-synchronized (e.g., aligned temporally). Because the timing of the sensor pulses SP1-SP6 is known (e.g., with respect to the local clock signal CLK), and because the camera modules C1-C6 are activated in accordance with a predetermined (e.g., fixed) sensor activation schedule, the timing of the sensor data from each of the camera modules C1-C6 may be accurately and reliably determined by a control system for an autonomous vehicle. This enables the sensor data to be quickly and accurately combined to generate 3D sensor images (e.g., in real-time) that can be used for navigating an autonomous vehicle.

In some implementations, some of the camera modules C1-C6 may operate at different times and/or framerates. For example, certain sensors may be more critical to the vehicle's operations, and therefore require higher resolution, than other sensors. Moreover, an autonomous vehicle may include a vast number of sensors (e.g., 20+ camera modules) that assist with vehicle navigation and/or other functions. Attempting to capture sensor data from all of the sensors at the same time may create a bottleneck in the vehicle's control system (e.g., depending on the bandwidth or capacity of the vehicle's communications infrastructure, processors, and/or memory). Thus, in some instances, it may be desirable to offset the activation of individual sensors to prevent overloading the communications bandwidth of the vehicle control system.

Table 2 shows an example sensor activation schedule that may be used to operate camera modules C1 and C2 at 3 frames per second while operating camera modules C3-C6 operate at 2 frames per second. The timing of camera modules C3 and C4 may be offset relative to the timing of camera modules C5 and C6, for example, to avoid bottlenecks in the communication of sensor data. With reference to Table 2, a "1" indicates that the camera is to be activated at the given instance of time, whereas a "0" indicates that the camera is not to be activated at the given time. The sensor activation schedule below shows the sensor activation times for a single clock cycle of a local clock signal. In some aspects, the sensor activation schedule of Table 2 may be repeated for subsequent clock cycles of the local clock signal. In other aspects, the sensor activation schedule of Table 2 may be modified or substituted for other sensor activation schedules in subsequent clock cycles.

TABLE 2

| Time | C1 | C2 | C3 | C4 | C5 | C6 | SP |
|---|---|---|---|---|---|---|---|
| $t_1$ | 1 | 1 | 0 | 0 | 0 | 0 | SP1 |
| $t_2$ | 0 | 0 | 1 | 1 | 0 | 0 | SP2 |
| $t_3$ | 1 | 1 | 0 | 0 | 1 | 1 | SP3 |
| $t_4$ | 0 | 0 | 0 | 0 | 0 | 0 | SP4 |
| $t_5$ | 1 | 1 | 1 | 1 | 0 | 0 | SP5 |
| $t_6$ | 0 | 0 | 0 | 0 | 1 | 1 | SP6 |

In the example sensor activation schedule of Table 2, each of the camera modules C1 and C2 is scheduled to capture sensor (e.g., image) data three times per clock cycle (e.g., 3 frames per second), at times $t_1$, $t_3$, and $t_5$. Each of the camera modules C3 and C4 is scheduled to capture sensor data twice per clock cycle (e.g., 2 frames per second), at times $t_2$ and $t_5$; and each of the camera module C5 and C6 is scheduled to captures sensor data twice per clock cycle (e.g., 2 frames per second), at times $t_3$ and $t_6$. Accordingly, the pulse distribution logic 230 may provide or distribute the first sensor pulse SP1 to camera modules C1 and C2, the second sensor pulse SP2 to camera modules C2 and C3, the third sensor pulse SP3 to camera modules C1, C2, C5, and C6, the fifth sensor pulse SP5 to camera modules C1-C4, and the sixth sensor pulse SP6 to camera modules C5 and C6. Because no camera module is activated at time $t_4$, the fourth sensor pulse SP4 may not be distributed to any of the camera modules C1-C6.

Figure 4B:
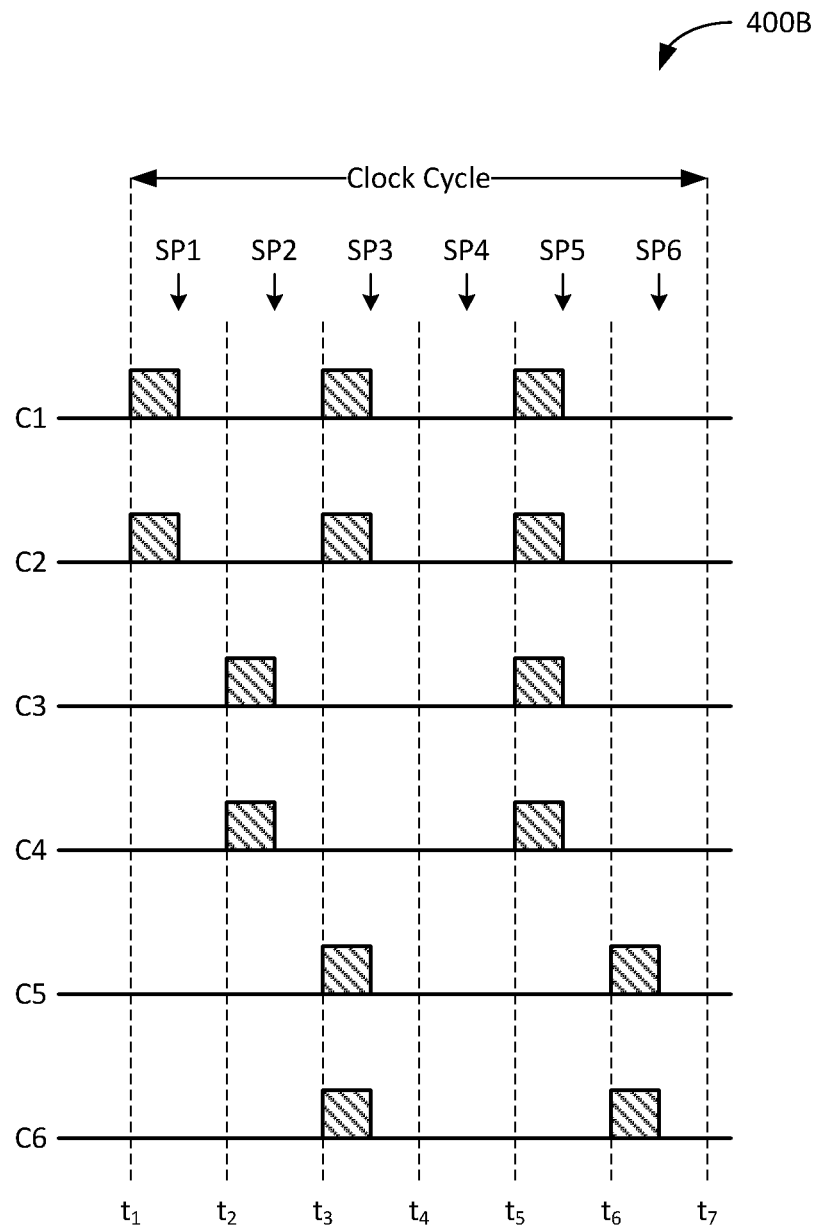

FIG. 4B shows a timing diagram 400B depicting an example implementation of the sensor activation schedule of Table 2 for a single clock cycle of a local clock signal (e.g., from times $t_1$-$t_7$). For example, at time $t_1$, each of the camera modules C1 and C2 captures respective sensor data in response to the first sensor pulse SP1; at time $t_2$, each of the camera module C3 and C4 captures respective sensor data in response to the second sensor pulse SP2; at time $t_3$, each of the camera modules C1, C2, C5, and C6 captures respective sensor data in response to the third sensor pulse SP3; at time $t_5$, each of the camera modules C1-C4 captures respective sensor data in response to the fifth sensor pulse SP5; and at time $t_6$, each of the camera modules C5 and C6 captures respective sensor data in response to the sixth sensor pulse SP6. No sensor data is captured at time $t_4$.

As shown in the example of FIG. 4B, sensor data captured by camera modules C1 and C2 may be combined to generate 3D sensor images at times $t_1$, $t_3$, and $t_5$; sensor data captured by camera modules C3 and C4 may be combined to generate 3D sensor images at times $t_2$ and $t_5$; and sensor data captured by camera modules C5 and C5 may be combined to generate 3D sensor images at times $t_3$ and $t_6$. Still further, at time $t_3$, the sensor data captured by camera modules C1 and C2 coincides (e.g., is time-synchronized) with the sensor data captured by camera modules C5 and C6. Thus, in some aspects, the sensor data captured by camera modules C1, C2, C5, and C6 may be combined to generate a more detailed and/or complete 3D sensor image at time $t_3$. Similarly, at time $t_5$, the sensor data captured by camera modules C1 and C2 coincides with the sensor data captured by camera modules C3 and C4. Thus, in some aspects, the sensor data captured by camera modules C1-C4 may be combined to generate a more detailed and/or complete 3D sensor image at time $t_5$.

Still further, in some implementations, a timing schedule may describe sensor activation times for multiple sensor apparatuses and/or sensors of different types. For example, in some aspects, it may be desirable to schedule the capture of camera data in synchronization with the capture laser rangefinder data (e.g., to generate a more complete 3D sensor image and/or use one type of sensor data to check or verify the information derived from the other type of sensor data).

Table 3 shows an example sensor activation schedule that may be used to operate each of the camera modules C1-C6 at 1 frame per second while concurrently operating a laser rangefinder (LR) at 6 frames per second. The timing of each of the camera modules C1-C6 may be offset, for example, to avoid bottlenecks in the communication of sensor data. With reference to Table 3, a "1" indicates that a corresponding sensor is to be activated at the given instance of time, whereas a "0" indicates that the sensor is not to be activated at the given time. The sensor activation schedule below shows the sensor activation times for a single clock cycle of a local clock signal. In some aspects, the sensor activation schedule of Table 3 may be repeated for subsequent clock cycles of the local clock signal. In other aspects, the sensor activation schedule of Table 3 may be modified or substituted for other sensor activation schedules in subsequent clock cycles.

TABLE 3

| Time | C1 | C2 | C3 | C4 | C5 | C6 | LR | SP |
|------|----|----|----|----|----|----|----|-----|
| $t_1$ | 1 | 0 | 0 | 0 | 0 | 0 | 1 | SP1 |
| $t_2$ | 0 | 1 | 0 | 0 | 0 | 0 | 1 | SP2 |
| $t_3$ | 0 | 0 | 1 | 0 | 0 | 0 | 1 | SP3 |
| $t_4$ | 0 | 0 | 0 | 1 | 0 | 0 | 1 | SP4 |
| $t_5$ | 0 | 0 | 0 | 0 | 1 | 0 | 1 | SP5 |
| $t_6$ | 0 | 0 | 0 | 0 | 0 | 1 | 1 | SP6 |

In the example sensor activation schedule of Table 3, each of the camera modules C1, C2, C3, C4, C5, and C6 is scheduled to capture sensor (e.g., image) data once per clock cycle (e.g., 1 frame per second), at times $t_1$, $t_2$, $t_3$, $t_4$, $t_5$, and $t_6$, respectively. In addition, the laser rangefinder is scheduled to capture sensor (e.g., distance) data six times per clock cycle (e.g., 6 frames per second), at each time interval from times $t_1$-$t_6$. Accordingly, the pulse distribution logic 230 may provide or distribute the first sensor pulse SP1 to the laser rangefinder and camera module C1, the second sensor pulse SP2 to the laser rangefinder and camera module C2, the third sensor pulse SP3 to the laser rangefinder and camera module C3, the fourth sensor pulse SP4 to the laser rangefinder and camera module C4, the fifth sensor pulse SP5 to the laser rangefinder and camera module C5, and the sixth sensor pulse SP6 to the laser rangefinder and camera module C6.

Figure 4C:
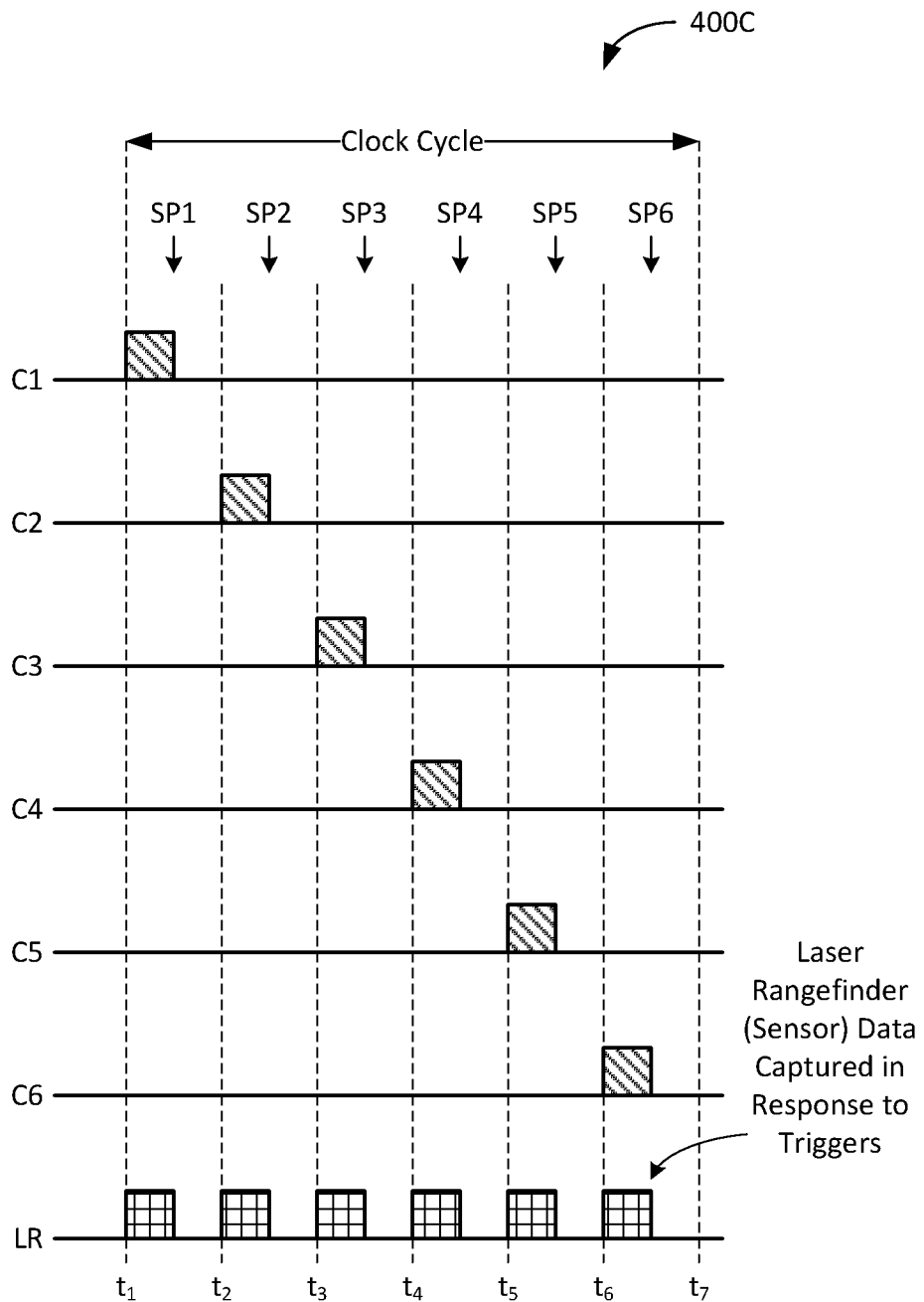

FIG. 4C shows a timing diagram 400C depicting an example implementation of the sensor activation schedule of Table 3 for a single clock cycle of a local clock signal (e.g., from times $t_1$-$t_7$). For example, at time $t_1$, the laser rangefinder and camera module C1 capture respective sensor data in response to the first sensor pulse SP1; at time $t_2$, the laser rangefinder and camera module C2 capture respective sensor data in response to the second sensor pulse SP2; at time $t_3$, the laser rangefinder and camera module C3 capture respective sensor data in response to the third sensor pulse SP3; at time $t_4$, the laser rangefinder and camera module C4 capture respective sensor data in response to the fourth sensor pulse SP4; at time $t_5$, the laser rangefinder and camera module C5 capture respective sensor data in response to the fifth sensor pulse SP5; and at time $t_6$, the laser rangefinder and camera module C6 capture respective sensor data in response to the sixth sensor pulse SP6.

As shown in the example of FIG. 4C, image data captured by camera module C1, C2, C3, C4, C5, and C6 may be combined with respective distance data captured by the laser rangefinder to generate 3D sensor images at time $t_1$, $t_2$, $t_3$, $t_4$, $t_5$, and $t_6$, respectively. As described above, in some aspects, the distance data captured by the laser rangefinder may be used to check or verify information (e.g., size and/or distance of objects) derived from corresponding camera data captured by a respective one of the cameras C1-C6 at any given time.

In the example of FIG. 4C, the laser rangefinder is shown to operate in response to triggers (e.g., sensor pulses) from the pulse distribution logic 230. However, for some implementations, the laser rangefinder may capture distance data at a predetermined sampling rate (e.g., 1 Hz) which may not be adjustable and/or controllable by the sensor synchronization system 200. Thus, the example implementations further recognize that it may be desirable to acquire timing information for such asynchronous sensor data, for example, to enable the distance data captured by the laser rangefinder to be combined with corresponding image data captured by the camera modules C1-C6 to generate an accurate 3D sensor image.

Referring back to the example of FIG. 2, the sensor data acquisition interface 240 may process incoming sensor data 202 received from one or more sensor apparatuses. In example implementations, the sensor data acquisition interface 240 may convert the incoming sensor data 202 into clock-synchronized sensor data 204. In some aspects, the sensor data acquisition interface 240 may determine a timing of the incoming sensor data 202 in relation to the local clock signal 214. The timing information may be provided with the clock-synchronized sensor data 204 to enable the corresponding sensor data to be used for vehicle navigation and/or controlling one or more functions or operations of an autonomous vehicle. For example, as described above, the times at which sensor data is captured or acquired may be an important component for generating an accurate 3D sensor image based on the sensor data. Combining mismatched sensor data (e.g., sensor data that is not temporally aligned) may lead to optical distortions or artifacts in the resulting 3D sensor image.

In some examples, the incoming sensor data 202 may include time-synchronized sensor data captured in response to triggers 232 from the pulse distribution logic 230 (e.g., as described above with respect to FIGS. 4A-4C). The interface 240 may determine timing information for the time-synchronized sensor data, for example, by referencing the sensor activation schedule 205. As described above, the sensor activation schedule 205 may indicate the precise data capture (e.g., sensor activation) times, in relation to the local clock signal 214, of any time-synchronized sensor data.

In other examples, the incoming sensor data 202 may include asynchronous sensor data that may not be captured in response to triggers 232 from the sensor synchronization system 200. The interface 240 may determine timing information for the asynchronous sensor data, for example, by comparing the incoming sensor data 202 with the plurality of sensor pulses 222(1)-222(N). More specifically, the interface 240 may determine which of the sensor pulses 222(1)-222(N) most closely coincides with the time at which the asynchronous sensor data is captured or acquired (e.g., received by the sensor data acquisition interface 240). Since each of the sensor pulses 222(1)-222(N) is offset in phase relative to the local clock signal 214 by a predetermined amount, the interface 240 may quickly determine the relative timing of any incoming asynchronous sensor data (e.g., in relation to the local clock signal 214) based on the comparison.

In some implementations, the sensor data acquisition interface 240 may format the incoming sensor data 202 (e.g., into clock-synchronized sensor data 204) for a particular communications platform implemented by the autonomous vehicle. For example, the interface 240 may include sub-modules for adding a timestamp 242, a header 244, a footer 246, a status bit (SB) 248, and/or other platform-specific information or parameters to the incoming sensor data 202. The added information may enable the incoming sensor data 202 to be recognized and/or processed by one or more processors or controllers of the autonomous vehicle. The timestamp 242 may indicate the time at which corresponding sensor data is captured or acquired in relation to the local clock signal 214. The header 244 and footer 246 may indicate the beginning and end, respectively, of the sensor data (e.g., which may be provided as a payload) received from a particular sensor at a given instance of time. The status bit 248 may be used to perform a parity check and/or verify the validity of the sensor data.

Figure 5:
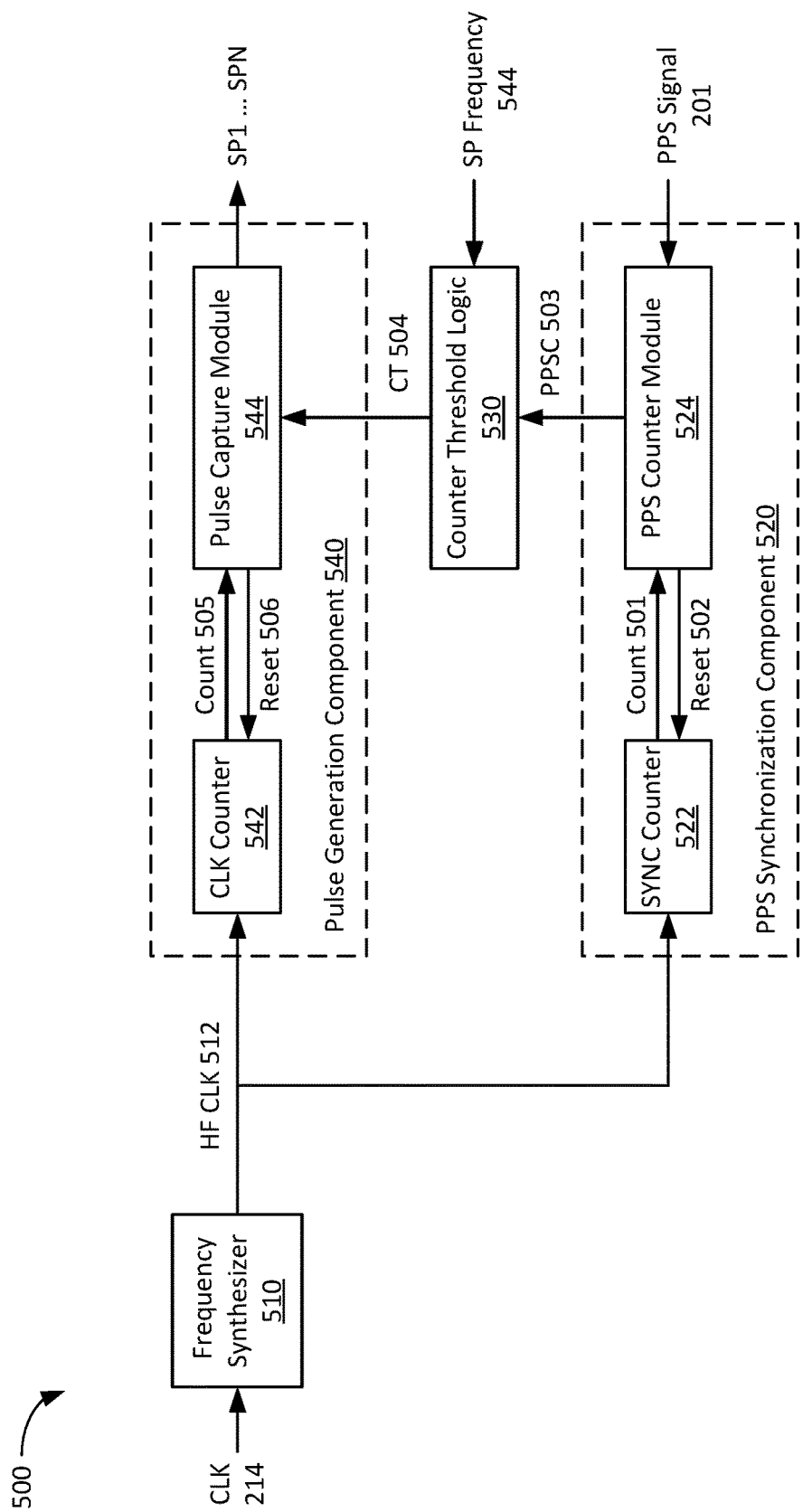
FIG. 5 shows a block diagram of a sensor pulse generator circuit, in accordance with example implementations.

FIG. 5 shows a block diagram of a sensor pulse (SP) generator circuit 500, in accordance with example implementations. For example, the SP generator circuit 500 may be an implementation of the sensor pulse generator 220 of FIG. 2. The SP generator circuit 500 includes a frequency synthesizer 510, a PPS synchronization component 520, counter threshold logic 530, and a pulse generation component 540. The SP generator circuit 500 may generate a number (N) of sensor pulses based at least in part on the local clock signal 214. As described above with respect to FIGS. 1-4C, the sensor pulses may be used to time and/or synchronize activation of multiple sensors of a sensor apparatus (not shown for simplicity).

The frequency synthesizer 510 generates a high-frequency (HF) local clock signal (CLK) 512 based on the local clock signal 214. For example, the frequency synthesizer 510 may include a phase-locked loop (PLL) circuit which locks the phase of an output signal (e.g., HF local clock signal 512) to the phase of an input signal (e.g., local clock signal 214) while adjusting the frequency of the output signal relative to the input signal (e.g., through frequency division). The HF local clock signal 512 is provided to the PPS synchronization component 520 and the pulse generation component 540.

The PPS synchronization component 520 synchronizes the HF local clock signal 512 with the PPS signal 201, for example, by determining a frequency of the HF local clock signal 512 relative to the PPS signal 201. For example, the PPS synchronization component 520 may count the number of pulses of the HF local clock signal 512 that occur within a clock cycle or interval of the PPS signal 201 (e.g., 1 second). In some examples, the PPS synchronization component 520 may include a SYNC counter 522 and a PPS counter module 524. The SYNC counter 522 may continuously count the number of signal pulses (e.g., rising or falling edges) of the HF local clock signal 512 and may update and/or increment a count value 501 in response to each consecutive pulse. When a pulse is detected on the PPS signal 201, the PPS counter module 524 may store the current count value 501, as a PPS count (PPSC) 503, and reset the count value 501 (e.g., by asserting a reset signal 502).

Figure 6:
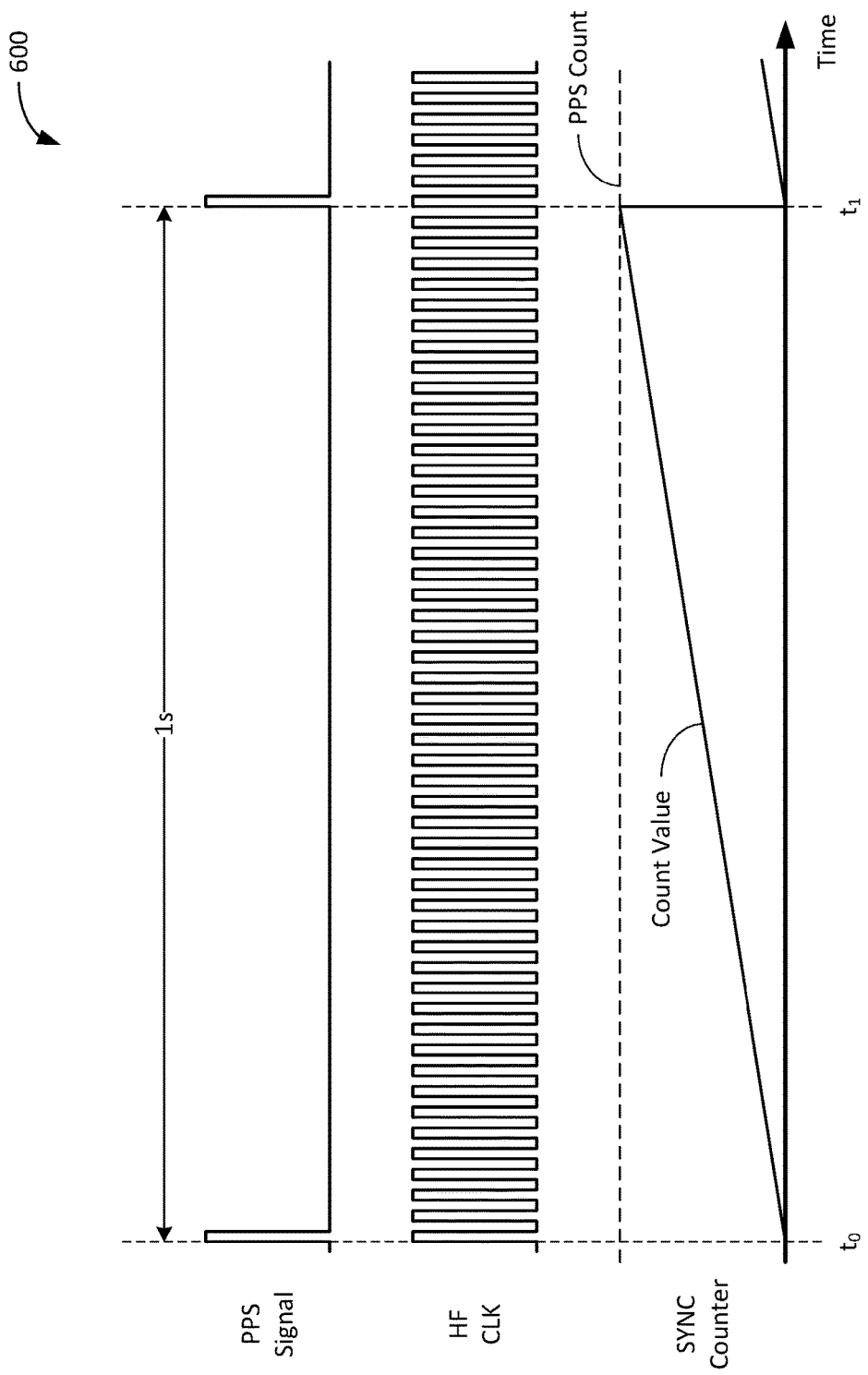
FIG. 6 shows a timing diagram depicting an example operation for synchronizing a high-frequency (HF) local clock signal with a pulse per second (PPS) signal.

FIG. 6 shows a timing diagram 600 depicting an example operation for synchronizing an HF local clock signal with a PPS signal. The PPS signal, HF CLK, and SYNC counter may be example implementations of PPS signal 201, HF CLK 512, and SYNC counter 530, respectively, of FIG. 5. At time $t_0$, the PPS counter module 524 detects a pulse of the PPS signal 201 and causes the SYNC counter 522 to reset the count value 501 (e.g., by asserting the reset signal 502). The SYNC counter 522 then proceeds to count the pulses of the HF local clock signal 512, for example, by updating or incrementing the count value 501 in response to each signal pulse. Upon detecting a subsequent pulse of the PPS signal 201, at time $t_1$, the PPS counter module 524 may store the current state of the count value 501, as the PPS count 503, and cause the SYNC counter 522 to reset the count value 501 (e.g., by asserting the reset signal 502). Thus, the PPS count 503 (e.g., at time $t_1$) may indicate a number (M) of pulses of the HF local clock signal 512 occurring over a PPS signal interval (e.g., from times $t_0$ to $t_1$).

Referring back to FIG. 5, the counter threshold logic 530 may determine one or more count thresholds (CT) 504 based on the PPS count 503 and a desired sensor pulse (SP) frequency 544. The SP frequency 544 represents the frequency at which sensor pulses SP1-SPN (e.g., sensor pulses 222(1)-222(N) of FIG. 2) are generated. The count threshold 504 may correspond with a number (K) of pulses of the HF local clock signal 512 occurring between consecutive sensor pulses SP1-SPN at the given SP frequency 544. In example implementations, the counter threshold logic 530 may determine the count threshold 504 by dividing the PPS count 503 by the SP frequency 544. For example, the PPS count 503 may indicate the number (M) of pulses of the HF local clock signal 512 occurring in a 1 second interval and the SP frequency 544 may indicate the number (N) of sensor pulses to occur within a 1 second interval (e.g., K=M/N). For some examples, the counter threshold logic 530 may update the count threshold 504 each time a new PPS count 503 is received from the PPS synchronization component 520 (e.g., for every cycle of the PPS signal 201).

The pulse generation component 540 may generate the sensor pulses SP1-SPN based on the HF local clock signal 512, at the rate indicated by the SP frequency 544. For example, the pulse generation component 540 may count the number of pulses of the HF local clock signal 512 and generate a respective sensor pulse each time the number of pulses reaches the count threshold 504. In some examples, the pulse generation component 540 may include a CLK counter 542 and a pulse capture module 544. The CLK counter 542 may continuously count the number of signal pulses (e.g., rising or falling edges) of the HF local clock signal 512 and may update and/or increment a count value 505 in response to each consecutive pulse. When the count value 505 reaches or exceeds the count threshold 504, the pulse capture module 544 may generate a respective sensor pulse SP1-SPN and reset the count value 505 (e.g., by asserting a reset signal 506).

Figure 7A:
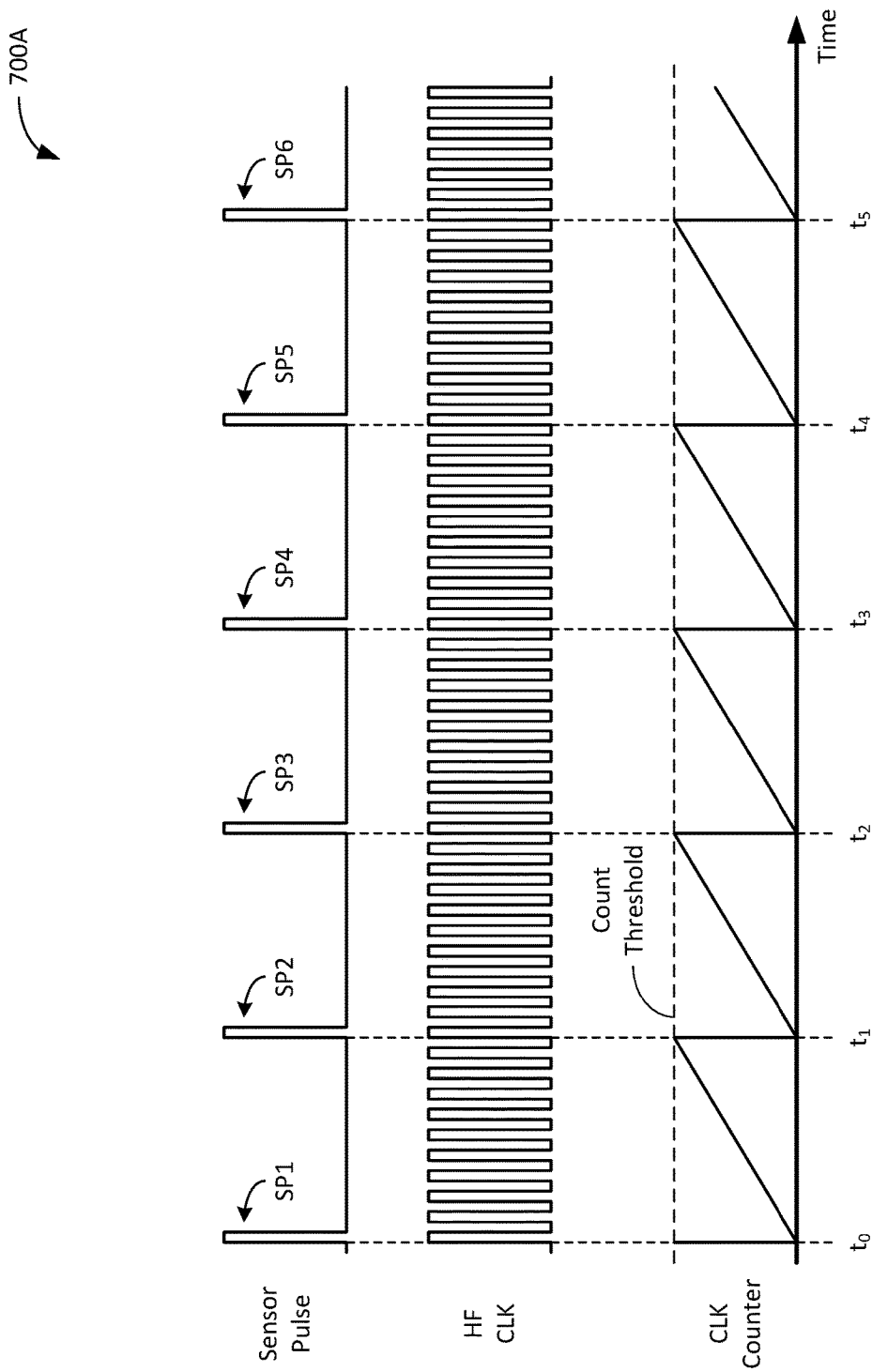
FIGS. 7A and 7B show timing diagrams depicting example operations for generating sensor pulses based on an HF local clock signal.
Figure 7B:
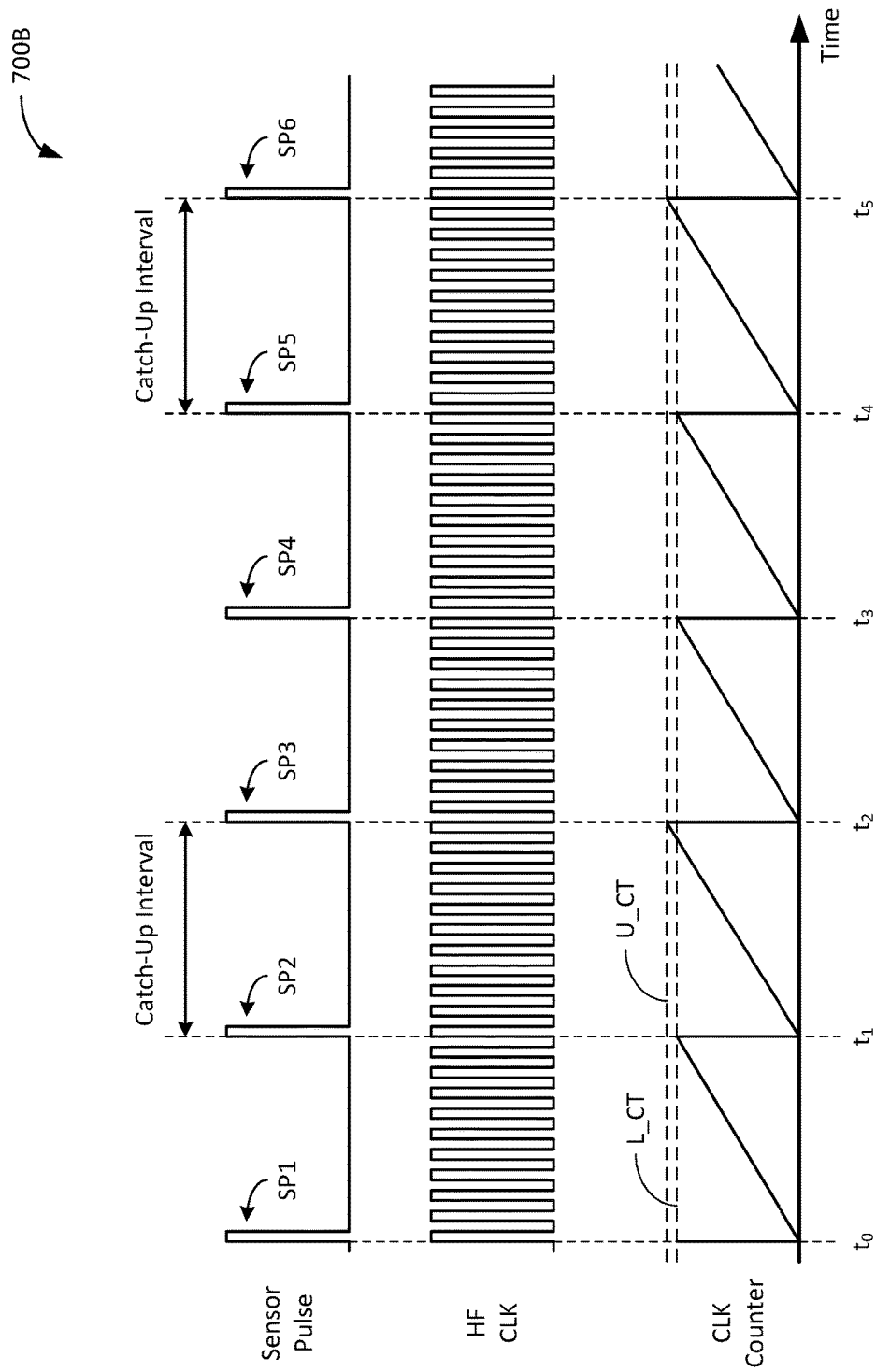

FIGS. 7A and 7B show respective timing diagrams 700A and 700B depicting example operations for generating sensor pulses based on an HF local clock signal. The pulse capture signal, HF CLK, and CLK counter may be example implementations of PC 507, HF CLK 512, and CLK counter 542, respectively, of FIG. 5.

With reference to FIG. 7A, the pulse capture module 544 may detect that the count value 505 has reached the count threshold 504 at time $t_0$. Accordingly, the pulse capture module 544 may generate a sensor pulse SP1 (e.g., for a duration substantially equal to a pulse duration of the HF local clock signal 512) and cause the CLK counter 542 to reset the count value 505 (e.g., by asserting the reset signal 506). The CLK counter 542 then proceeds to count the pulses of the HF local clock signal 512, for example, by updating or incrementing the count value 505 in response to each signal pulse. Upon detecting that the count value 501 has once again reached the count threshold 504, at time $t_1$, the pulse capture module 544 may generate a subsequent sensor pulse SP2 and cause the CLK counter 542 to reset the count value 505. This process may be repeated to generate subsequent sensor pulses SP3, SP4, SP5, and SP6 at times $t_2$, $t_3$, $t_4$, and $t_5$, respectively.

In some implementations, the counter threshold logic 530 may determine multiple counter thresholds 504 for a given SP frequency 544. For example, the HF local clock signal 512 may operate at 20 kHz (e.g., M=20,000) and a desired framerate for a sensor apparatus may be 60 frames/samples per second. Thus, at a minimum, the SP frequency 544 may be set at 60 Hz (e.g., N=60). The counter threshold logic 530 may determine that a 60 Hz cycle coincides with 333.33 pulses of the HF local clock signal 512 (e.g., K=20,000/60). However, for some implementations, the count value 505 must be an integer value. Thus, the counter threshold logic 530 may set the count threshold 504 equal to 333. In other words, the pulse generation component 540 may output a sensor pulse for every 333 pulses of the HF local clock signal 512.

At 60 Hz, every third sensor pulse should occur after a total of 1,000 pulses of the HF local clock signal 512 have been counted. However, by generating a sensor pulse every 333 pulses of the HF local clock signal 512, the pulse generation component 540 would output the third sensor pulse after only 999 pulses of the HF clock signal 512. In this manner, the sensor pulses SP1-SPN will fall behind the actual SP frequency 544 by one pulse of the HF local clock signal 512 every 3 sensor pulses. To maintain synchronicity between the sensor pulses SP1-SPN and the HF local clock signal 512, the counter threshold logic 530 may add an additional pulse to the count threshold 504 for every third sensor pulse. In some implementations, any number of additional pulses may be implemented, for example, as a second (e.g., upper) count threshold. An example of this implementation is illustrated in FIG. 7B.

With reference to FIG. 7B, the pulse capture module 544 may detect that the count value 505 has reached a lower count threshold (L_CT) at time $t_0$. Accordingly, the pulse capture module 544 may generate a first sensor pulse SP1 (e.g., for a duration substantially equal to a pulse duration of the HF local clock signal 512) and cause the CLK counter 542 to reset the count value 505 (e.g., by asserting the reset signal 506). At time $t_1$, the pulse capture module 544 may detect that the count value 505 has once again reached the lower count threshold L_CT, and thus generates a second sensor pulse SP2 and resets the count value 505. In the example of FIG. 7B, the next sensor pulse SP3 may coincide with a "catch-up" interval. Thus, the pulse capture module 544 may ignore the lower count threshold L_CT and continue to monitor the count value 505 until it reaches an upper count threshold (U_CT), at time $t_2$. At time $t_2$, the pulse capture module 544 may generate a third sensor pulse SP3 and cause the CLK counter 542 to once again reset the count value 505. In this manner, the catch-up interval allows HF local clock signal 512 to reestablish synchronicity with (e.g., catch up to) the sensor pulses. This process may be repeated to generate subsequent sensor pulses SP4, SP5, and SP6 at times $t_3$, $t_4$, and $t_5$, respectively.

Figure 8:
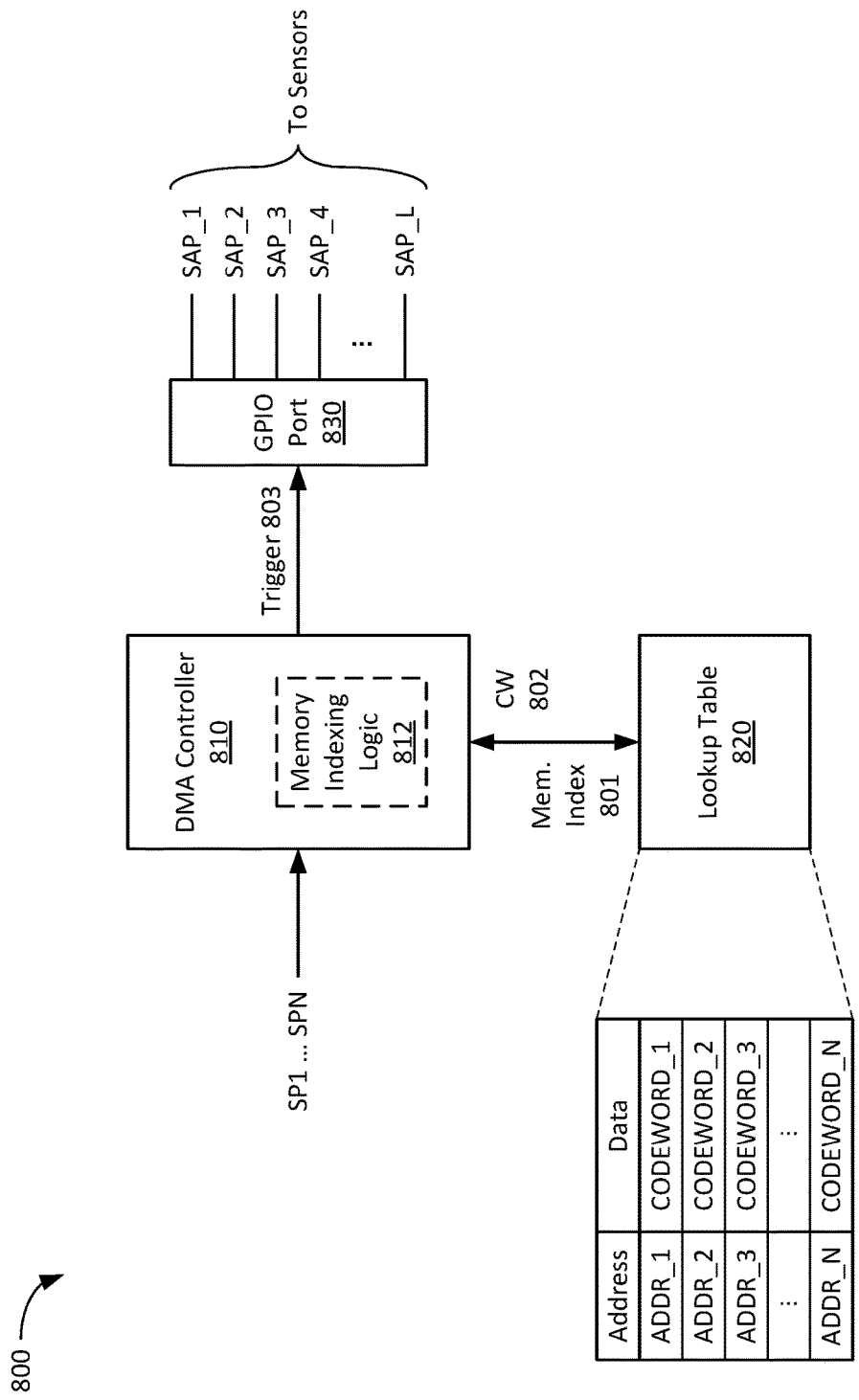
FIG. 8 shows a block diagram of a pulse distribution logic, in accordance with example implementations.

FIG. 8 shows a block diagram of a pulse distribution logic 800, in accordance with example implementations. For example, the pulse distribution logic 800 may be an implementation of pulse distribution logic 230 of FIG. 2. The pulse distribution logic 800 includes a direct memory access (DMA) controller 810, a lookup table 820, and a general purpose input/output (GPIO) port 830. The DMA controller 810 may receive the sensor pulses SP1-SPN from a sensor pulse generator (e.g., SP generator circuit 500 of FIG. 5) and may generate a set of trigger signals 803 in response to each sensor pulse. In example implementations, the DMA controller 810 may generate the triggers 803 based at least in part on codewords (CW) 802 stored in the lookup table 820. The lookup table 820 may store a number of codewords (CODEWORD_1-CODEWORD_N) in respective memory locations (ADDR_1-ADDR_N).

For some examples, the DMA controller 810 may include a memory indexing logic 810 that correlates each of the sensor pulses SP1-SPN with a corresponding memory index 801. The memory index 801 may point to or otherwise correspond with a memory address or location (e.g., ADDR_1-ADDR_N) of the lookup table 820. In some aspects, the memory indexing logic 812 may increment the memory index 801 for each consecutive sensor pulse. For example, the memory index 801 may initially point to the first memory address (e.g., ADDR_1) of the lookup table 820. In response to a first sensor pulse (e.g., SP1), the memory indexing logic 812 may retrieve a codeword 802

(e.g., CODEWORD_1) stored at the first memory address of the lookup table 820. Upon retrieving a codeword 802, the memory indexing logic 812 may increment the memory index 801 to point to the next memory address (e.g., ADDR_2) of the lookup table 820. Thus, in response to a second sensor pulse (e.g., SP2), the memory indexing logic 812 may retrieve a codeword 802 (e.g., CODEWORD_2) stored at the second memory address of the lookup table 820.

The process of iteratively reading codewords 802 from the lookup table 820 may be repeated for each of the N sensor pulses SP1-SPN and/or until the last codeword 802 (e.g., CODEWORD_N) has been read from the lookup table 820. In example implementations, the lookup table 820 may store a number (N) of codewords 802 equal to the number (N) of sensor pulses for a given PPS interval. Thus, when the memory indexing logic 812 receives the last sensor pulse (e.g., SPN) for the given PPS interval, the memory index 801 also points to the last memory address (e.g., ADDR_N) of the lookup table 820. At this point, incrementing the memory index 801 may reset or otherwise cause the memory index 801 to point back to the first memory address (e.g., ADDR_1) of the lookup table 820 (e.g., to coincide with the first sensor pulse for the next PPS interval).

Each of the codewords (e.g., CODEWORD_1-CODEWORD_N) may include activation instructions for one or more sensors of a sensor apparatus (not shown for simplicity). In example implementations, each codeword 802 may comprise a number (L) of bits equal to the number (L) of sensors in the sensor apparatus. Accordingly, each bit of a given codeword may represent an activation state (e.g., whether to trigger activation) of a respective sensor of the sensor apparatus. For example, the first bit of a codeword 802 may indicate an activation state of a first sensor of the sensor apparatus, the second bit of the codeword 802 may indicate an activation state of a second sensor of the sensor apparatus, and so on. Thus, an L-bit codeword may indicate activation states for each of L sensors of a sensor apparatus.

In example implementations, the DMA controller 810 may generate the trigger signals 803 based on codewords 802 read from the lookup table 820. The trigger signals 803 may be used to activate or assert a combination of sensor activation pins (e.g., SAP_1-SAP_L) of the GPIO port 830. For example, each sensor activation pin may be coupled to a respective sensor of the sensor apparatus. Asserting a particular sensor activation pin may trigger activation of the sensor coupled to that particular pin (e.g., causing the sensor to capture or acquire sensor data). For example, asserting SAP_1 may trigger activation of a first sensor of the sensor apparatus (e.g., coupled to SAP_1), asserting SAP_2 may trigger activation of a second sensor of the sensor apparatus (e.g., coupled to SAP_2), and so on. For some examples, the bits (L) of a given codeword 802 may directly correlate with the sensor activation pins (L) of the GPIO port 830. Thus, a given sensor activation pin of the GPIO port 830 may be asserted if a corresponding bit of the codeword 802 retrieved by the DMA controller 810 is activated (e.g., a logical "1"), and may be deasserted if the corresponding bit of the codeword 802 is deactivated (e.g., a logical "0").

With reference to the example timing diagram 400B of FIG. 4B, the sensor activation schedule of Table 2 may be implemented using an example data structure (e.g., lookup table 820) shown in Table 4, below:

TABLE 4

| Address | Data (Codeword) |
|---------|-----------------|
| 0x00    | 110000          |
| 0x01    | 001100          |
| 0x02    | 110011          |
| 0x03    | 000000          |
| 0x04    | 111100          |
| 0x05    | 000011          |

With reference to the data structure shown in Table 4, the memory index 801 of the memory indexing logic 812 may initially point to the first address (0x00) of the lookup table 820. In response to a first sensor pulse SP1, the DMA controller 810 may retrieve a codeword 802 (110000) stored at the first address (0x00) of the lookup table 820. Upon retrieving the codeword 802 from the lookup table 820, the memory indexing logic 812 may increment the memory index 801 to point to the second address (0x01) of the lookup table 820. The DMA controller 810 then generates one or more trigger signals 803, based on the retrieved codeword 802 (110000), causing the GPIO port 830 to assert the first and second sensor activation pins (e.g., SAP_1 and SAP_2). As shown in FIG. 4B, this results in the activation of camera modules C1 and C2 at time $t_1$.

In response to a second sensor pulse SP2, the DMA controller 810 may retrieve a codeword 802 (001100) stored at the second address (0x01) of the lookup table 820. Upon retrieving the codeword 802 from the lookup table 802, the memory indexing logic 812 may increment the memory index 801 to point to the third address (0x02) of the lookup table 820. The DMA controller 810 then generates one or more trigger signals 803, based on the retrieved codeword 802 (001100), causing the GPIO port 830 to assert the third and fourth sensor activation pins (e.g., SAP_2 and SAP_7). As shown in FIG. 4B, this results in the activation of camera modules C3 and C4 at time $t_2$.

In response to a third sensor pulse SP3, the DMA controller 810 may retrieve a codeword 802 (110011) stored at the third address (0x02) of the lookup table 820. Upon retrieving the codeword 802 from the lookup table 802, the memory indexing logic 812 may increment the memory index 801 to point to the fourth address (0x03) of the lookup table 820. The DMA controller 810 then generates one or more trigger signals 803, based on the retrieved codeword 802 (110011), causing the GPIO port 830 to assert the first, second, fifth, and sixth sensor activation pins (e.g., SAP_1, SAP_2, SAP5, and SAP_6). As shown in FIG. 4B, this results in the activation of camera modules C1, C2, C5, and C6 at time $t_3$.

In response to a fourth sensor pulse SP4, the DMA controller 810 may retrieve a codeword 802 (000000) stored at the fourth address (0x03) of the lookup table 820. Upon retrieving the codeword 802 from the lookup table 802, the memory indexing logic 812 may increment the memory index 801 to point to the fifth address (0x04) of the lookup table 820. The DMA controller 810 then generates one or more trigger signals 803, based on the retrieved codeword 802 (000000), causing all of the sensor activation pins (e.g., SAP_1-SAP_6) of the GPIO port 830 to remain deasserted. As shown in FIG. 4B, none of the camera modules C1-C6 are activated during time $t_4$.

In response to a fifth sensor pulse SP5, the DMA controller 810 may retrieve a codeword 802 (111100) stored at the fifth address (0x04) of the lookup table 820. Upon retrieving the codeword 802 from the lookup table 802, the memory indexing logic 812 may increment the memory index 801 to point to the sixth address (0x05) of the lookup table 820. The DMA controller 810 then generates one or more trigger signals 803, based on the retrieved codeword 802 (111100), causing the GPIO port 830 to assert the first, second, third, and fourth sensor activation pins (e.g., SAP_1-SAP_4). As shown in FIG. 4B, this results in the activation of camera modules C11-C4 at time $t_5$.

In response to a sixth sensor pulse SP6, the DMA controller 810 may retrieve a codeword 802 (000011) stored at the sixth address (0x05) of the lookup table 820. Upon retrieving the codeword 802 from the lookup table 802, the memory indexing logic 812 may increment the memory index 801 to point back to the first address (0x00) of the lookup table 820. The DMA controller 810 then generates one or more trigger signals 803, based on the retrieved codeword 802 (000011), causing the GPIO port 830 to assert the fifth and sixth sensor activation pins (e.g., SAP5 and SAP_6). As shown in FIG. 4B, this results in the activation of camera modules C5 and C6 at time $t_6$.

As described above, in some implementations, the frequency of sensor pulses may be substantially greater than the sampling rate of any of the sensors in the sensor apparatus. Thus, the pulse distribution logic 800 may receive a number of sensor pulses that should not trigger activation of any sensors of the sensor apparatus. For example, in such implementations, the lookup table 820 may store a number of null or "zero" codewords (e.g., where all bits of the codeword are zero).

Methodology

Figure 9:
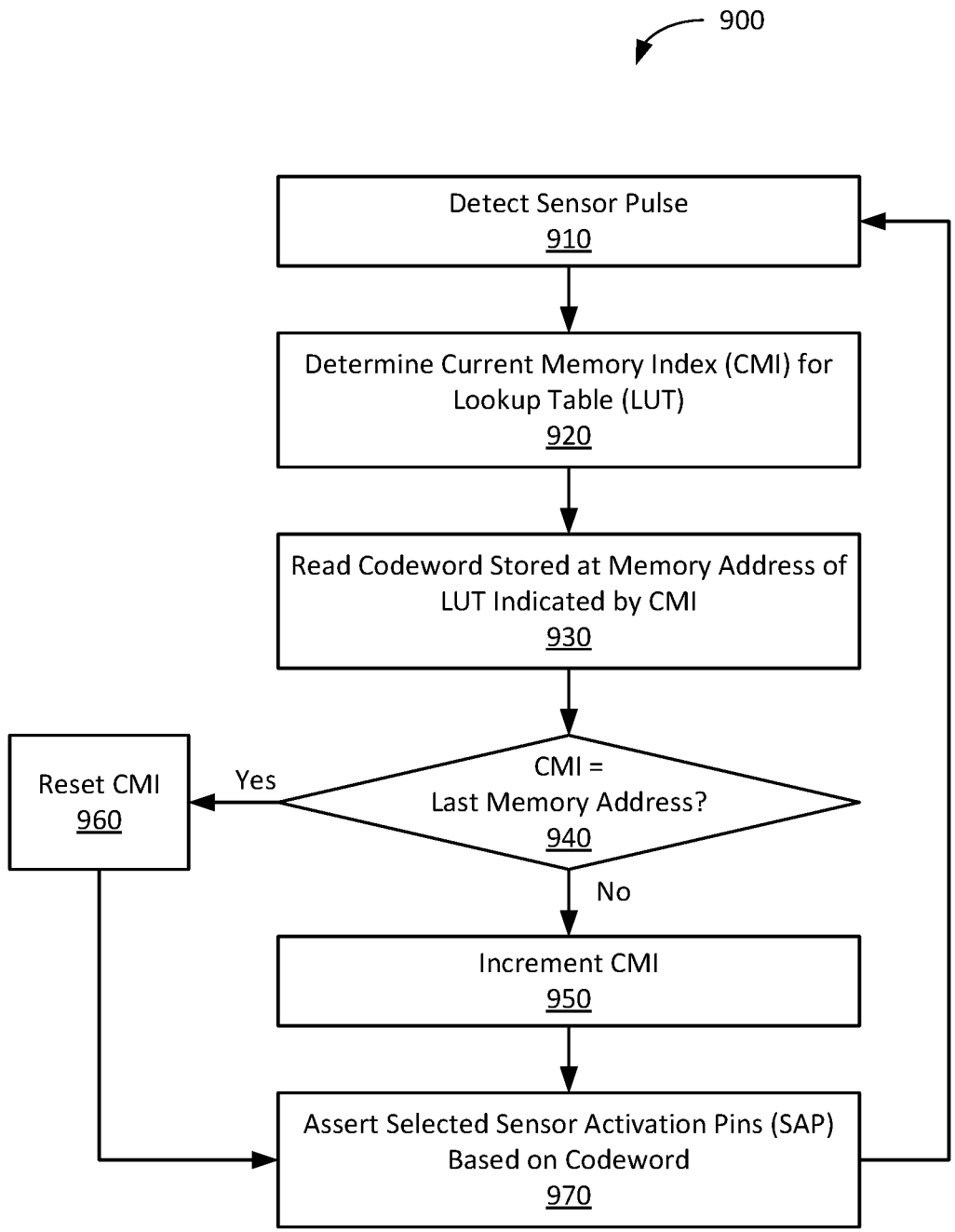
FIG. 9 shows a flowchart depicting an example operation for triggering sensor activation, in accordance with example implementations.

FIG. 9 shows a flowchart depicting an example operation 900 for triggering sensor activation, in accordance with example implementations. The operation 900 can be implemented, for example, by the pulse distribution logic 800 of FIG. 8. Accordingly, references made to the elements of FIG. 8 are for purposes of illustrating a suitable element or component for performing a step or sub-step being described.

The pulse distribution logic 800 detects a sensor pulse (910) and determines a current memory index for a lookup table in response to the sensor pulse (920). For example, the DMA controller 810 may receive the sensor pulse from a sensor pulse generator (e.g., SP generator 500 of FIG. 5). The memory indexing logic 812 may correlate the sensor pulse with a corresponding memory index 801 that points to, or otherwise corresponds with, a memory address or location of the lookup table 820.

The pulse distribution logic 800 then reads the codeword stored at the memory address of the lookup table indicated by the current memory index (930). For example, the lookup table 820 may store a number of codewords (CODE-WORD_1-CODEWORD_N) in respective memory locations (ADDR_1-ADDR_N). As described above, the memory index 801 may point to a particular memory location (e.g., ADDR_1-ADDR_N) in the lookup table 820. Thus, in example implementations, the DMA controller 810 may retrieve a codeword 802 stored at the memory location pointed to by the memory index 801.

Upon retrieving the codeword from the lookup table, the pulse distribution logic 800 may determine whether the current memory index points to the last memory address of the lookup table (940). In example implementations, the number (N) of memory addresses (and/or addressable locations) within the lookup table 820 may be equal to the number (N) of sensor pulses for a given PPS interval. Thus, indexing the last memory address of the lookup table 820 may signal the start of the next PPS interval.

If the current memory index does not point to the last memory address (as tested at 940), the pulse distribution logic 800 may increment the current memory index (950). For example, this may cause the memory index 801 to point to the next memory address of the lookup table 820. However, if the current memory index points to the last memory address (as tested at 940), the pulse distribution logic 800 may reset the current memory index (960). For example, this may cause the memory index 801 to point back to the first memory address of the lookup table 820.

Finally, the pulse distribution logic 800 may assert a selected set (or subset) of sensor activation pins based on the retrieved codeword (970). For example, the retrieved codeword 802 may include activation instructions for one or more sensors of a sensor apparatus. In example implementations, each codeword 802 may comprise a number (L) of bits equal to the number (L) of sensors in the sensor apparatus. Accordingly, each bit of a given codeword may represent an activation state of a respective sensor of the sensor apparatus. For example, an L-bit codeword may indicate activation states for each of L sensors of a sensor apparatus.

In example implementations, the DMA controller 810 may generate trigger signals 803 based on the codeword 802. The trigger signals 803 may be used to activate or assert a combination of sensor activation pins (e.g., SAP_1-SAP_L) of the GPIO port 830. Asserting a particular sensor activation pin may trigger activation of a sensor coupled to that particular pin. For some examples, the bits (L) of the retrieved codeword 802 may directly correlate with the sensor activation pins (L) of the GPIO port 830. Thus, a given sensor activation pin of the GPIO port 830 may be asserted if a corresponding bit of the retrieved codeword 802 is activated, and may be deasserted if the corresponding bit of the codeword 802 is deactivated.

Figure 10:
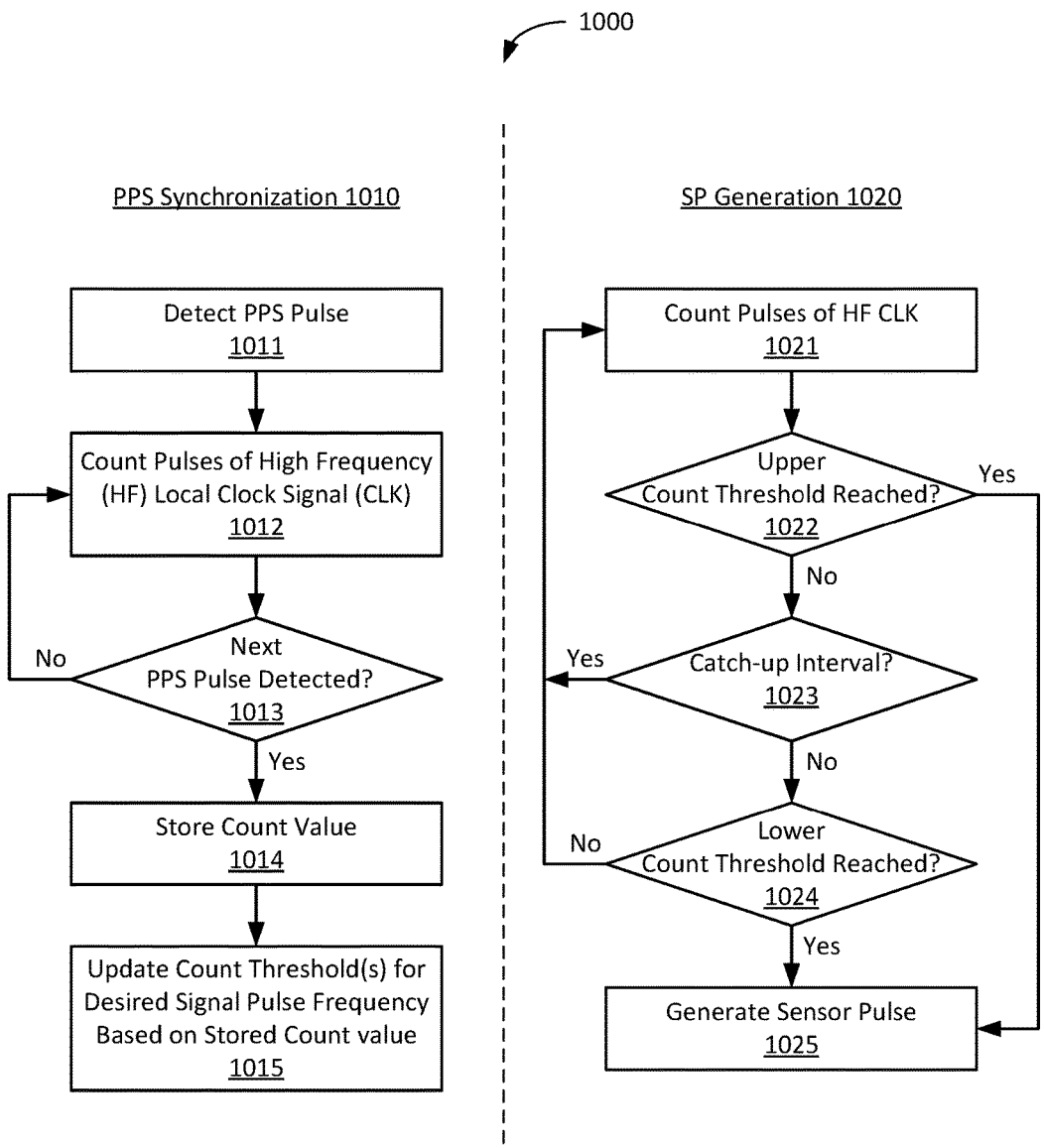
FIG. 10 shows a flowchart depicting an example operation for generating sensor pulses, in accordance with example implementations.

For some examples, the operation 900 (e.g., steps 910-970) may be repeated for each subsequent sensor pulse received by the pulse distribution logic 800. For example, the pulse distribution logic 800 my continuously and/or periodically trigger activation of selected sensors (e.g., by asserting respective sensor activation pins SAP_1-SAP_L) according to a schedule stored in the lookup table 820. FIG. 10 shows a flowchart depicting an example operation 100 for generating sensor pulses, in accordance with example implementations. The operation 1000 can be implemented, for example, by the sensor pulse generator circuit 500 of FIG. 5. Accordingly, references made to the elements of FIG. 5 are for purposes of illustrating a suitable element or component for performing a step or sub-step being described.

In example implementations, the operation 1000 may include a PPS synchronization operation 1010 and an SP generation operation 1020 that may be performed sequentially and/or concurrently with one another. For example, the PPS synchronization operation 1010 may be performed by the PPS synchronization component 520 of the sensor pulse generator circuit 500, and the SP generation operation 1020 may be performed by the pulse generation component 540 of the sensor pulse generator circuit 500.

The sensor pulse generator circuit 500 may perform the PPS synchronization operation 1010 by detecting a PPS pulse (1011) and, in response to the PPS pulse, begin counting a number of pulses of a high-frequency (HF) local clock signal (1012). For example, the SYNC counter 522 may continuously count the number of signal pulses (e.g., rising or falling edges) of the HF local clock signal 512 and may update and/or increment the count value 501 in response to each consecutive pulse. The PPS counter module 524 may receive the PPS signal 201 and, upon detecting a pulse on the PPS signal 201, may reset the count value 501 (e.g., by asserting a reset signal 502).

The sensor pulse generator circuit 500 may continue to count the pulses of the HF local clock signal (1012) as long as a subsequent PPS pulse has not yet been detected (1013). For example, the PPS synchronization component 520 may be configured to synchronize the HF clock signal 512 with the PPS signal 201. Thus, the PPS synchronization component 520 may count only the number of pulses of the HF local clock signal 512 that occur within a clock cycle or interval of the PPS signal 201 (e.g., 1 second).

If the sensor pulse generator circuit 500 detects a subsequent PPS pulse (as tested at 1013), the PPS synchronization component 520 may store the current count value (1014). For example, upon detecting a subsequent pulse of the PPS signal 201, the PPS counter module 524 may store the current state of the count value 501 (e.g., as the PPS count 503). Upon storing the PPS count 503, the PPS counter module 524 may then cause the SYNC counter 522 to reset the count value 501 (e.g., by asserting the reset signal 502).

The sensor pulse generator circuit 500 may then update one or more count thresholds for a desired signal pulse (SP) frequency based on the stored count value (1015). As described above, the SP frequency 544 represents the frequency at which sensor pulses SP1-SPN are generated. The count threshold 504 may correspond with a number (K) of pulses of the HF clock signal 512 occurring between consecutive sensor pulses SP1-SPN at the given frequency 544. In example implementations, the counter threshold logic 530 may determine the count threshold 504 by dividing the PPS count 503 by the SP frequency 544. Further, in some implementations, the counter threshold logic 530 may implement an additional count threshold which may be used during a catch-up interval (e.g., in instances where the SP frequency 544 does not divide evenly into the PPS count 503).

The sensor pulse generator circuit 500 may perform the SP generation operation 1020 by counting the pulses of the HF local clock signal (1021) and comparing the count value to one or more count thresholds. For example, the CLK counter 542 may continuously count the number of signal pulses (e.g., rising or falling edges) of the HF local clock signal 512 and may update and/or increment the count value 505 in response to each consecutive pulse. The pulse capture module 544 may compare the count value 505 to one or more count thresholds to determine when to generate sensor pulses.

For example, the sensor pulse generator circuit 500 may first determine if an upper count threshold has been reached (1022). In example implementations, the upper count threshold may provide for one or more additional pulses of the HF local clock signal 512 (e.g., compared to a lower count threshold). As described above with respect to FIG. 7B, the upper count threshold (U_CT) may coincide with a catch-up interval. More specifically, the upper count threshold may delay the generation of a signal pulse during a catch-up interval, for example, to allow the HF local clock signal 512 to reestablish synchronicity with (e.g., catch up to) the sensor pulses generated by the sensor pulse generator circuit 500. In some instances, the pulse capture module 544 may not implement an upper count threshold (e.g., as described above with respect to FIG. 7A).

If the upper count threshold is reached (as tested at 1022), the sensor pulse generator circuit 500 may generate a sensor pulse (1025). For example, as shown in FIGS. 7A-7B, the pulse capture module 544 may generate a sensor pulse (e.g., SP1-SPN) that coincides with a respective pulse of the HF local clock signal 512. In some examples, the sensor pulse may be asserted for a duration substantially equal to a pulse duration of the HF local clock signal 512. If the upper count threshold has not been reached (as tested at 1022) during a catch-up interval (as tested at 1023), the sensor pulse generator circuit 500 may continue counting the pulses of the HF local clock signal (1021) until the upper count threshold is reached.

If the upper count threshold has not been reached (as tested at 1022) outside of a catch-up interval (as tested at 1023), the sensor pulse generator circuit 500 may then determine whether a lower count threshold has been reached (1024). For example, the lower count threshold may correspond with a number (K) of pulses of the HF local clock signal 512 typically expected to occur between consecutive sensor pulses SP1-SPN at the given SP frequency 544. As described above with respect to FIG. 7B, the pulse capture module 544 may more often compare the count value 505 to the lower count threshold than to the upper count threshold in determining when to generate a sensor pulse.

If the lower count threshold is reached (as tested at 1024), the pulse generator circuit 500 may generate a sensor pulse (1025). As described above, the pulse capture module 544 may generate a sensor pulse (e.g., SP1-SPN) that coincides with a respective pulse of the HF local clock signal 512. However, if the lower count threshold has not been reached (as tested at 1024), the pulse generator circuit 500 may continue counting the pulses of the HF local clock signal 512 (1021) until at least the lower count threshold is reached.

Hardware Diagrams

Figure 11:
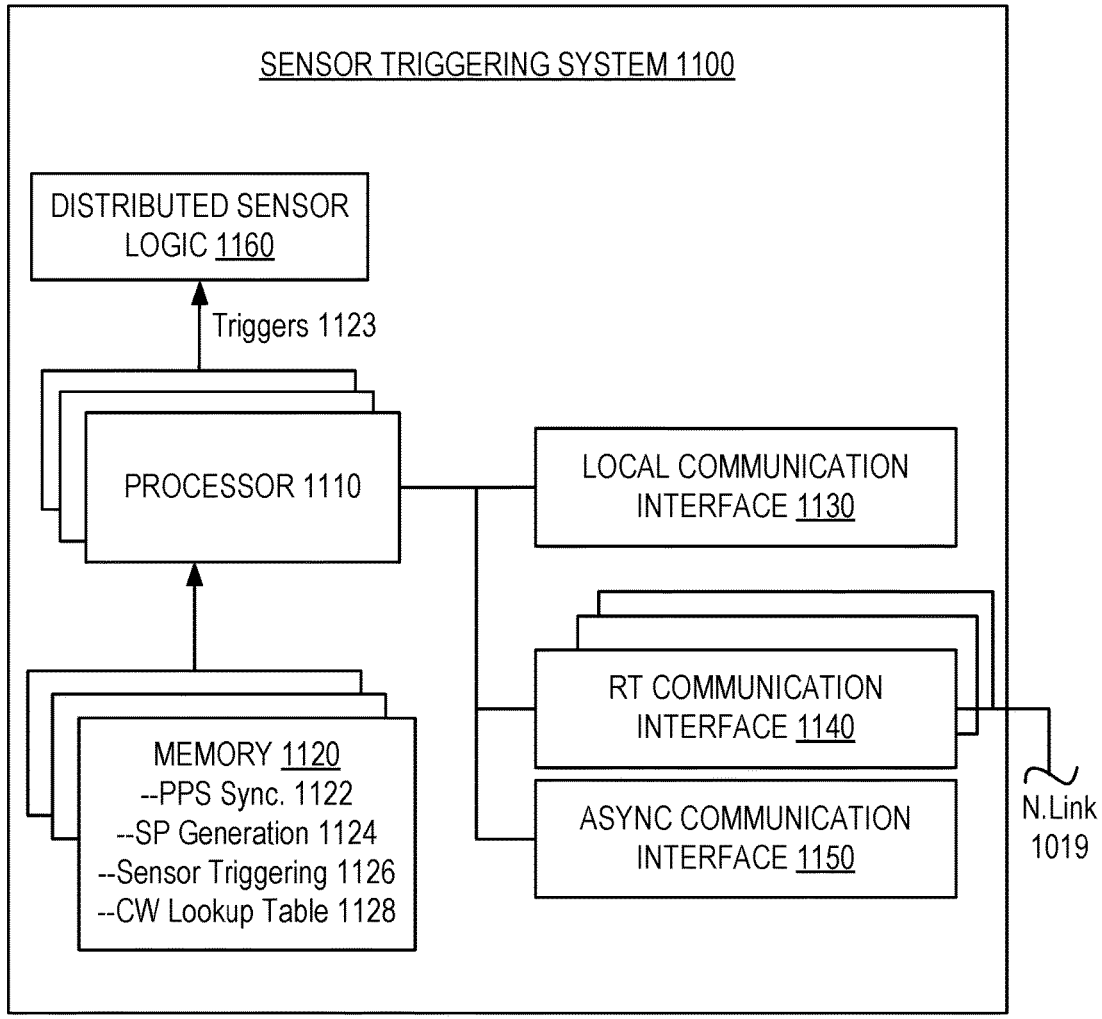
FIG. 11 shows a block diagram of a sensor triggering system that may be implemented on an autonomous vehicle, in accordance with example implementations.

FIG. 11 shows a block diagram of a sensor triggering system 1100 that may be implemented on an autonomous vehicle, in accordance with example implementations. The sensor triggering system 1100 can be implemented using one or more processors 1110, memory resources 1120, and a distributed sensor logic 1160. In the context of FIGS. 5 and 8 functions and/or operations of the sensor pulse generator circuit 500 and/or pulse distribution logic 800 may be implemented using one or more components of the sensor triggering system 1100.

According to some examples, the sensor triggering system 1100 may be implemented within an autonomous vehicle with software and hardware resources such as described with examples of FIGS. 5, 8, 9 and 10. For example, as illustrated in FIG. 11, the sensor triggering system 1100 can be distributed spatially into various regions of a vehicle. For example, the processors 1110 and/or memory resources 1120 can be provided in the trunk of a vehicle. The distributed sensor logic 1160 may be implemented using microprocessors and/or integrated circuits. In some examples, the distributed sensor logic 1160 may be implemented using field-programmable gate arrays (FPGA).

As illustrated in FIG. 11, the sensor triggering system 1100 may include a local communication interface 1130 (or series of local links) to vehicle interfaces and other resources of an autonomous vehicle. In one implementation, the local communication interface 1130 provides a data bus or other local link to electromechanical interfaces of the vehicle, such as used to operate steering, acceleration and braking, as well as to data resources of the vehicle (e.g., vehicle processor, OBD memory, etc.). The sensor triggering system 1100 may further include multiple communication interfaces, such as real-time (RT) communication interface 1140 and asynchronous communication interface 1150. The various communication interfaces 1140 and 1150 may send and receive communications to other vehicles, central services, human assistance operators, or other remote entities for a variety of purposes.

One or more of the communication interfaces 1140 and/or 1150 can enable the autonomous vehicle to communicate with one or more networks (e.g., cellular network) through use of a network link 1019, which can be wireless or wired. The sensor triggering system 1100 can establish and use multiple network links 1019 at the same time. Using the network link 1019, the sensor triggering system 1100 can communicate with one or more remote entities, such as network services or human operators. In one implementation, the real-time communication interface 1140 can be optimized to communicate information instantly, in real-time to remote entities (e.g., human assistance operators). In contrast, the asynchronous communication interface 1150 may communicate information at predetermined intervals and/or according to a schedule (e.g., vehicle status updates, software updates, etc.).

The memory resources 1120 may include, for example, main memory, a read-only memory (ROM), storage device, and cache resources. The main memory can include random access memory (RAM) or other dynamic storage device, for storing information and instructions which are executable by the processors 1110. The processors 1110 can execute instructions for processing information stored in the memory resources 1120. The memory resources 1120 can also store temporary variables or other intermediate information which can be used during execution of instructions by one or more of the processors 1110. The memory resources 1120 can also include ROM or other static storage device for storing static information and instructions for one or more of the processors 1110. The memory resources 1120 can also include other forms of memory devices and components, such as a magnetic disk or optical disk, for purpose of storing information and instructions for use by one or more of the processors 1110.

According to some examples, the memory resources 1120 may store a plurality of software instructions including, for example, a pulse per second (PPS) synchronization software 1122, a sensor pulse (SP) generation software 1124, sensor triggering software 1126, and a codeword (CW) lookup table 1128. During runtime (e.g., when the vehicle is operational), the software instructions 1122-1128 may be executed by one or more of the processors 1110 and/or distributed sensor logic 1160 in order to implement functionality such as described with respect to the sensor pulse generator circuit 500 of FIG. 5 and/or the pulse distribution logic 800 of FIG. 8.

For example, in operating an autonomous vehicle, the distributed sensor logic 1160, in combination with one or more of the processors 1110, may execute the PPS synchronization software 1122 to synchronize a high-frequency local clock signal with a PPS signal received from a GPS receiver (e.g., as described above with respect to FIG. 5). For example, in executing the PPS synchronization software 1122, the distributed sensor logic 1160 may count a number of pulses of the high-frequency local clock signal occurring between consecutive PPS pulses to determine a frequency of the high-frequency local clock signal relative to the PPS signal (e.g., as described above with respect to FIG. 6).

Further, the distributed sensor logic 1160, in combination with the one or more processors 1110, may execute the SP generation software 1124 to generate a number of sensor pulses based at least in part on the high-frequency local clock signal (e.g., as described above with respect to FIG. 5). For example, in executing the SP generation software 1124, the distributed sensor logic 1160 may count a number of pulses of the high-frequency local clock signal and generate a respective sensor pulse each time the number of pulses reaches the a count threshold (e.g., as described above with respect to FIGS. 7A-7B).

Still further, the distributed sensor logic 1160, in combination with the one or more processors 1110, may execute the sensor triggering software 1126 to selectively activate one or more sensors of a sensor apparatus in response to the sensor pulses (e.g., as described above with respect to FIG. 8). For example, in executing the sensor triggering software 1126, the distributed sensor logic 1160 may retrieve a codeword from the codeword lookup table 1128, in response to each sensor pulse, and assert a set (or subset) of sensor activation pins based on respective bits of the codeword (e.g., as described above with respect to FIG. 8).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A sensor triggering system for an autonomous vehicle (AV), the sensor triggering system comprising:
   a memory that stores instructions for operating a plurality of sensors of the AV; and
   one or more processors executing the instructions, causing the sensor triggering system to:
      detect a first sensor pulse from a pulse generator of the AV;
      in response to detecting the first sensor pulse, determine a first codeword from a first memory address of a lookup table based on a current memory index pointing to the first memory address in the lookup table; and
      selectively trigger the plurality of sensors based on the first codeword stored at the first memory address.

2. The system of claim 1, wherein the first codeword comprises a plurality of bits equal to a number of sensors in the plurality of sensors.

3. The sensor triggering system of claim 2, wherein each bit of the first codeword indicates an activation state for a respective one of the plurality of sensors.

4. The sensor triggering system of claim 3, wherein execution of the instructions to selectively trigger the plurality of sensors causes the sensor triggering system to:
   for each sensor of the plurality of sensors, trigger the sensor if a corresponding bit of the first codeword is asserted.

5. The sensor triggering system of claim 1, wherein execution of the instructions further causes the sensor triggering system to:

detect, from the pulse generator, a second sensor pulse that is offset in phase relative to the first sensor pulse by a predetermined amount;

in response to detecting the second sensor pulse, determine a second codeword from a second memory address of the lookup table based on the current memory index pointing to the second memory address in the lookup table; and selectively trigger the plurality of sensors based on the second codeword stored at the second memory address.

6. The sensor triggering system of claim 5, wherein execution of the instructions causes the sensor triggering system to determine the second codeword from the second memory address by incrementing the current memory index after selectively triggering the plurality of sensors based on the first codeword.

7. The sensor triggering system of claim 1, wherein the pulse generator generates the first sensor pulse based on a local clock signal from a positioning system of the AV.

8. The sensor triggering system of claim 7, wherein the pulse generator determines a number of clock pulses of the local clock signal and generates the first sensor pulse when the number of clock pulses reaches a count threshold.

9. The sensor triggering system of claim 8, wherein the local clock signal comprises a pulse per second (PPS) signal, wherein the positioning system comprises a global positioning system (GPS) receiver, and wherein the pulse generator determines the count threshold based at least in part on a number of clock pulses of the local clock signal occurring between consecutive pulses of the PPS signal.

10. A non-transitory computer-readable storage medium storing instructions that, when executed by one or more processors of an autonomous vehicle (AV), cause the one or more processors to:

detect a first sensor pulse from a pulse generator of the AV;

in response to detecting the first sensor pulse, determine a first codeword from a first memory address of a lookup table based on a current memory index pointing to the first memory address in the lookup table; and selectively trigger a plurality of sensors of the AV based on the first codeword stored at the first memory address.

11. The non-transitory computer-readable medium of claim 10, wherein the first codeword comprises a number of bits equal to a number of sensors in the plurality of sensors.

12. The non-transitory computer-readable medium of claim 11, wherein each bit of the first codeword indicates an activation state for a respective one of the plurality of sensors.

13. The non-transitory computer-readable medium of claim 12, wherein the executed instructions cause the one or more processors to selectively trigger the plurality of sensors by, for each sensor of the plurality of sensors, triggering the sensor if a corresponding bit of the first codeword is asserted.

14. The non-transitory computer-readable medium of claim 10, wherein the executed instructions further cause the one or more processors to:

detect, from the pulse generator, a second sensor pulse that is offset in phase relative to the first sensor pulse by a predetermined amount;

in response to detecting the second sensor pulse, determine a second codeword from a second memory address of the lookup table based on the current memory index pointing to the second memory address in the lookup table; and selectively trigger the plurality of sensors based on the second codeword stored at the second memory address.

15. The non-transitory computer-readable medium of claim 14, wherein the executed instructions cause the one or more processors to determine the second codeword from the second memory address by incrementing the current memory index after selectively triggering the plurality of sensors based on the first codeword.

16. The non-transitory computer-readable medium of claim 10, wherein the pulse generator generates the first sensor pulse based on a local clock signal from a positioning system of the AV.

17. The non-transitory computer-readable medium of claim 16, wherein the pulse generator determines a number of clock pulses of the local clock signal and generates the first sensor pulse when the number of clock pulses reaches a count threshold.

18. The non-transitory computer-readable medium of claim 17, wherein the local clock signal comprises a pulse per second (PPS) signal, wherein the positioning system comprises a global positioning system (GPS) receiver, and wherein the pulse generator determines the count threshold based at least in part on a number of clock pulses of the local clock signal occurring between consecutive pulses of the PPS signal.

19. An autonomous vehicle (AV) comprising:
acceleration, braking and steering systems;
a pulse generator;
a plurality of sensors; and
an AV control system comprising one or more processors and a memory that stores a set of instructions, wherein the set of instructions, when executed by the one or more processors, cause the AV control system to:
detect a first sensor pulse from the pulse generator;
in response to detecting the first sensor pulse, determine a first codeword from a first memory address of a lookup table based on a current memory index pointing to the first memory address in the lookup table; and
selectively trigger the plurality of sensors of the AV based on the first codeword stored at the first memory address.

20. The AV of claim 19 further comprising:
a positioning system, wherein the pulse generator (i) generates the first sensor pulse based on a clock signal from a positioning system of the AV and (ii) determines a number of clock pulses of the clock signal and generates the first sensor pulse when the number of clock pulses reaches a count threshold.

* * * * *